United States Patent
Bae et al.

(10) Patent No.: US 11,480,362 B2
(45) Date of Patent: Oct. 25, 2022

(54) AIR PURIFIER CAPABLE OF ADJUSTING WIND DIRECTION

(71) Applicant: COWAY CO., LTD., Chungcheongnam-do (KR)

(72) Inventors: Jun-Hyoung Bae, Seoul (KR); Tae-Seok Shin, Seoul (KR); Chan-Jung Park, Seoul (KR); Sang-Woo Kang, Seoul (KR); In-Kyu Back, Seoul (KR)

(73) Assignee: COWAY CO., LTD., Chungcheongnam-do (KR)

( * ) Notice: Subject to any disclaimer, the term of this patent is extended or adjusted under 35 U.S.C. 154(b) by 784 days.

(21) Appl. No.: 16/346,892

(22) PCT Filed: Dec. 7, 2017

(86) PCT No.: PCT/KR2017/014268
§ 371 (c)(1),
(2) Date: May 2, 2019

(87) PCT Pub. No.: WO2018/106032
PCT Pub. Date: Jun. 14, 2018

(65) Prior Publication Data
US 2020/0182508 A1    Jun. 11, 2020

(30) Foreign Application Priority Data

Dec. 7, 2016   (KR) .......................... 10-2016-0166033
Dec. 28, 2016  (KR) .......................... 10-2016-0180637

(51) Int. Cl.
*B01D 46/42*     (2006.01)
*F24F 13/10*     (2006.01)
(Continued)

(52) U.S. Cl.
CPC .............. *F24F 13/10* (2013.01); *B01D 46/42* (2013.01); *F24F 8/10* (2021.01); *F24F 13/20* (2013.01);
(Continued)

(58) Field of Classification Search
CPC .. B01D 46/24; B01D 46/0047; B01D 46/005; B01D 46/0005; B01D 46/42;
(Continued)

(56) References Cited

U.S. PATENT DOCUMENTS 9,821,259 B2 *  11/2017  Bae ........................ F24F 1/0071
10,323,855 B2 *  6/2019  Jung ........................ F24F 11/89
(Continued)

FOREIGN PATENT DOCUMENTS

CN         105605685        5/2016
EP         3091303          2/2019
(Continued)

OTHER PUBLICATIONS

Chinese Office Action for 201780073198.8 dated Dec. 22, 2020, 12 pages.
(Continued)

*Primary Examiner* — Minh Chau T Pham
(74) *Attorney, Agent, or Firm* — Dority & Manning, P.A.

(57) ABSTRACT

An air purifier capable of adjusting wind directions according to an embodiment of the present invention comprises: a housing having an air outlet port on one side thereof; an air guide having a front end portion disposed at the center of the air outlet port such that the air outlet port becomes a ring shape and a rear end portion extending in a direction toward the other surface of the housing and coupled to the inside of the housing so as to be rotatable in a direction inclined with respect to the air release direction of the air outlet port; and a rotation-restraining portion for restraining the rotation of (Continued)

the air guide by elastically supporting the air guide on the housing.

18 Claims, 19 Drawing Sheets

(51) Int. Cl.
  *F24F 11/79* (2018.01)
  *F24F 13/08* (2006.01)
  *F24F 13/20* (2006.01)
  *F24F 8/10* (2021.01)

(52) U.S. Cl.
  CPC .... *B01D 2273/30* (2013.01); *F24F 2013/205* (2013.01)

(58) Field of Classification Search
  CPC .......... F24F 1/0071; F24F 7/007; F24F 11/89; F24F 11/30; F24F 11/52; F24F 13/20; F24F 11/79; F24F 13/08; F04D 29/462; F04D 29/403; F04D 29/703
  USPC .................................................. 55/471–473
  See application file for complete search history.

(56) References Cited

U.S. PATENT DOCUMENTS

| | | | | |
|---|---|---|---|---|
| 10,563,667 B2* | 2/2020 | Park | .......... | F24F 7/007 |
| 10,639,576 B2* | 5/2020 | Jung | .......... | B01D 46/42 |
| 10,697,665 B2* | 6/2020 | Jung | .......... | F24F 1/0071 |
| 10,845,078 B2* | 11/2020 | Mun | .......... | F04D 29/462 |
| 10,920,792 B2* | 2/2021 | Xiao | .......... | B01D 46/0047 |
| 11,090,598 B2* | 8/2021 | Bae | .......... | B01D 46/24 |
| 2014/0053591 A1 | 2/2014 | Shin et al. | | |
| 2016/0032942 A1 | 2/2016 | Jung et al. | | |
| 2020/0182508 A1 | 6/2020 | Bae et al. | | |

FOREIGN PATENT DOCUMENTS

| | | |
|---|---|---|
| JP | S4627788 | 9/1971 |
| JP | H3204565 | 9/1991 |
| JP | 200188542 | 4/2001 |
| JP | 2016059859 | 4/2016 |
| JP | 2016511384 | 4/2016 |
| JP | 6921955 | 8/2021 |
| KR | 1020050046082 | 6/2006 |
| KR | 20120005357 | 7/2012 |
| KR | 101240536 | 3/2013 |
| KR | 20140012437 | 2/2014 |
| KR | 1020140028191 | 3/2014 |
| KR | 20140093158 | 7/2014 |
| KR | 20150092067 | 8/2015 |
| KR | 20160012796 | 2/2016 |
| KR | 20160017587 | 2/2016 |

OTHER PUBLICATIONS

International Search Report for PCT/KR2017/014268 dated Mar. 16, 2018, 4 pages.

Malaysian Office Action for corresponding Malaysian Application No. PI2019002724, dated Aug. 20, 2022, 3 pages.

* cited by examiner

【FIG. 1】
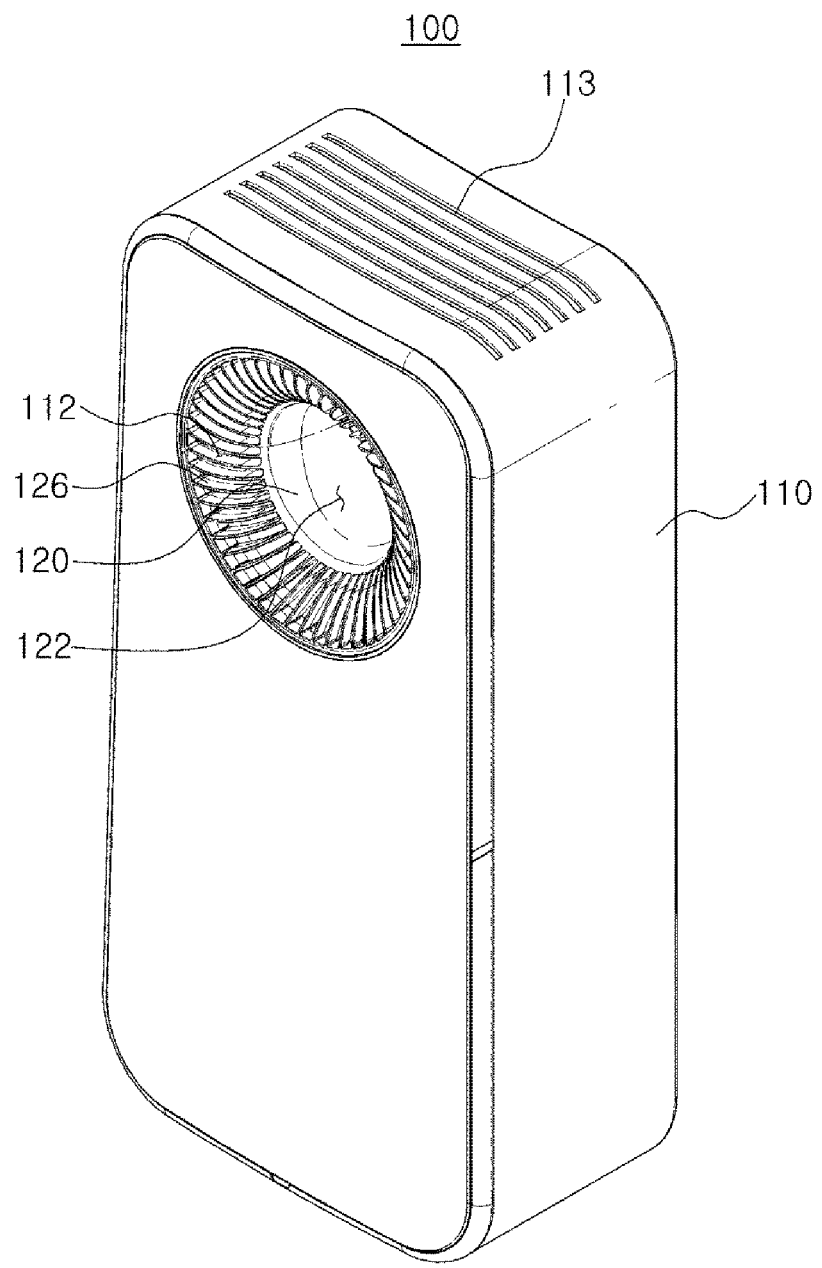

[FIG. 2]
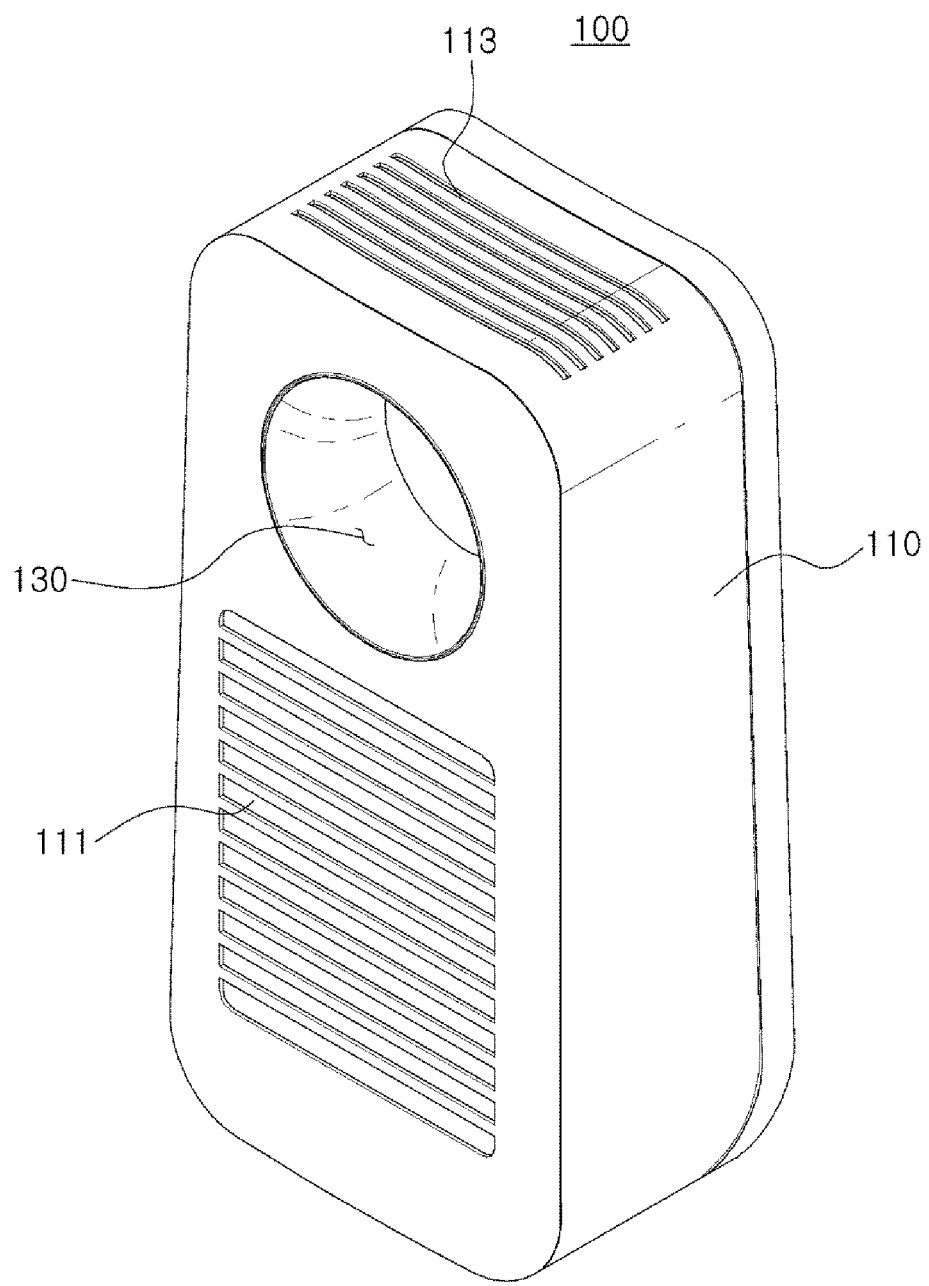

[FIG. 3]
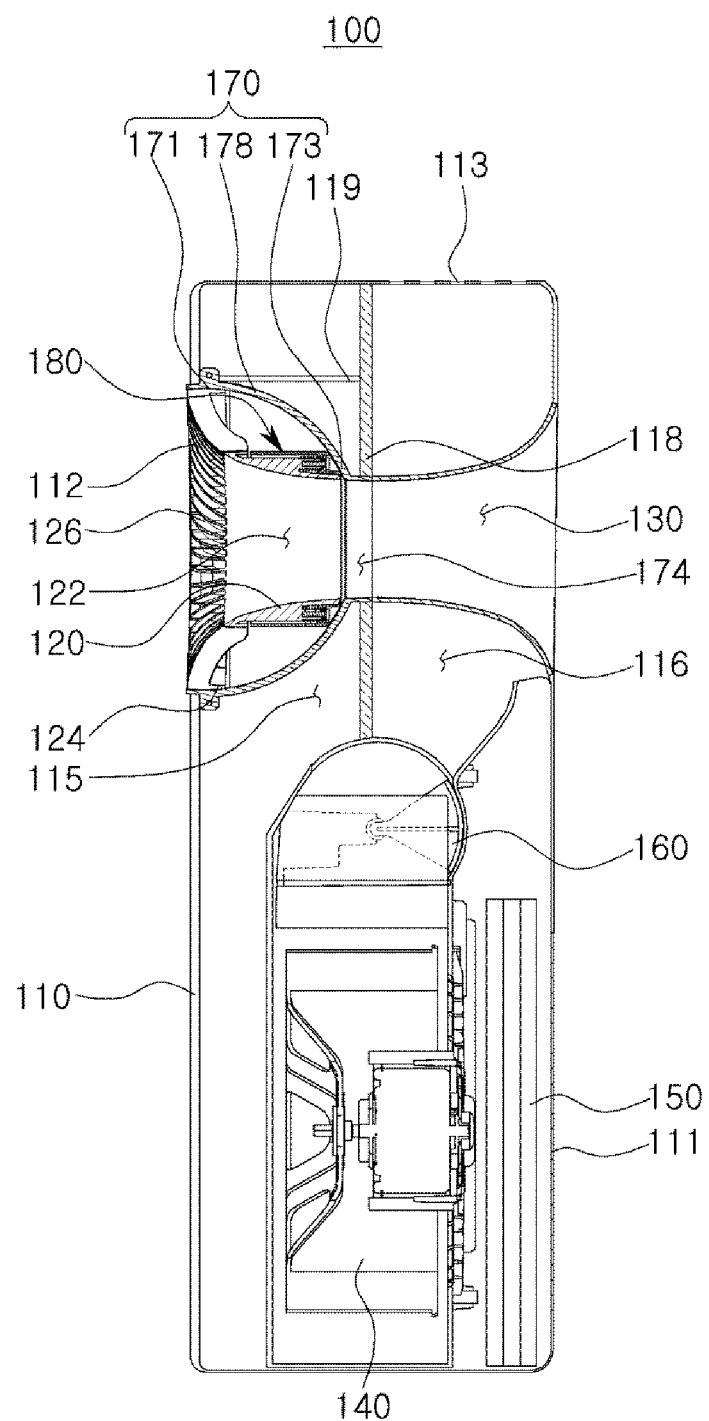

[FIG. 4]
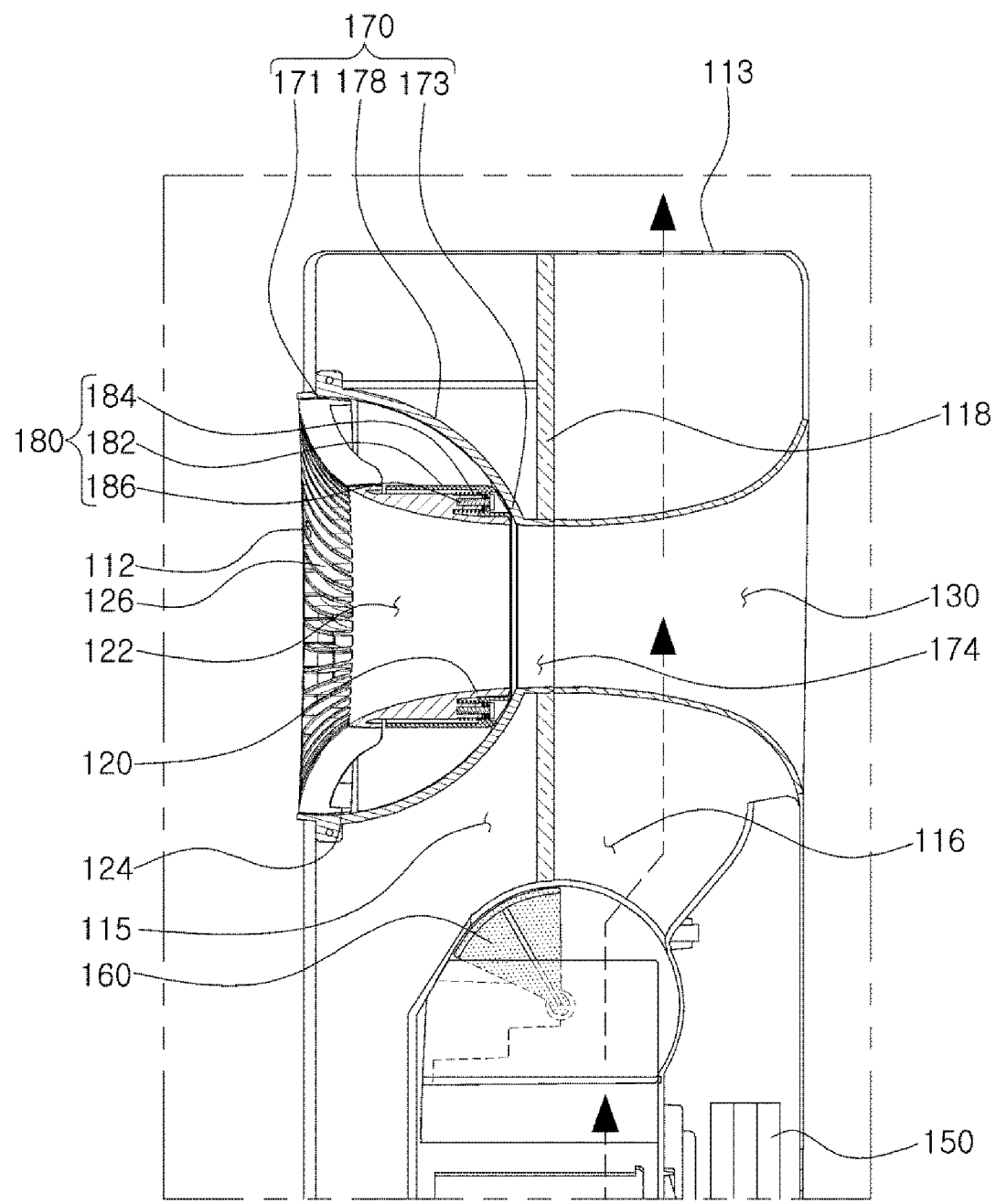

[FIG. 5]
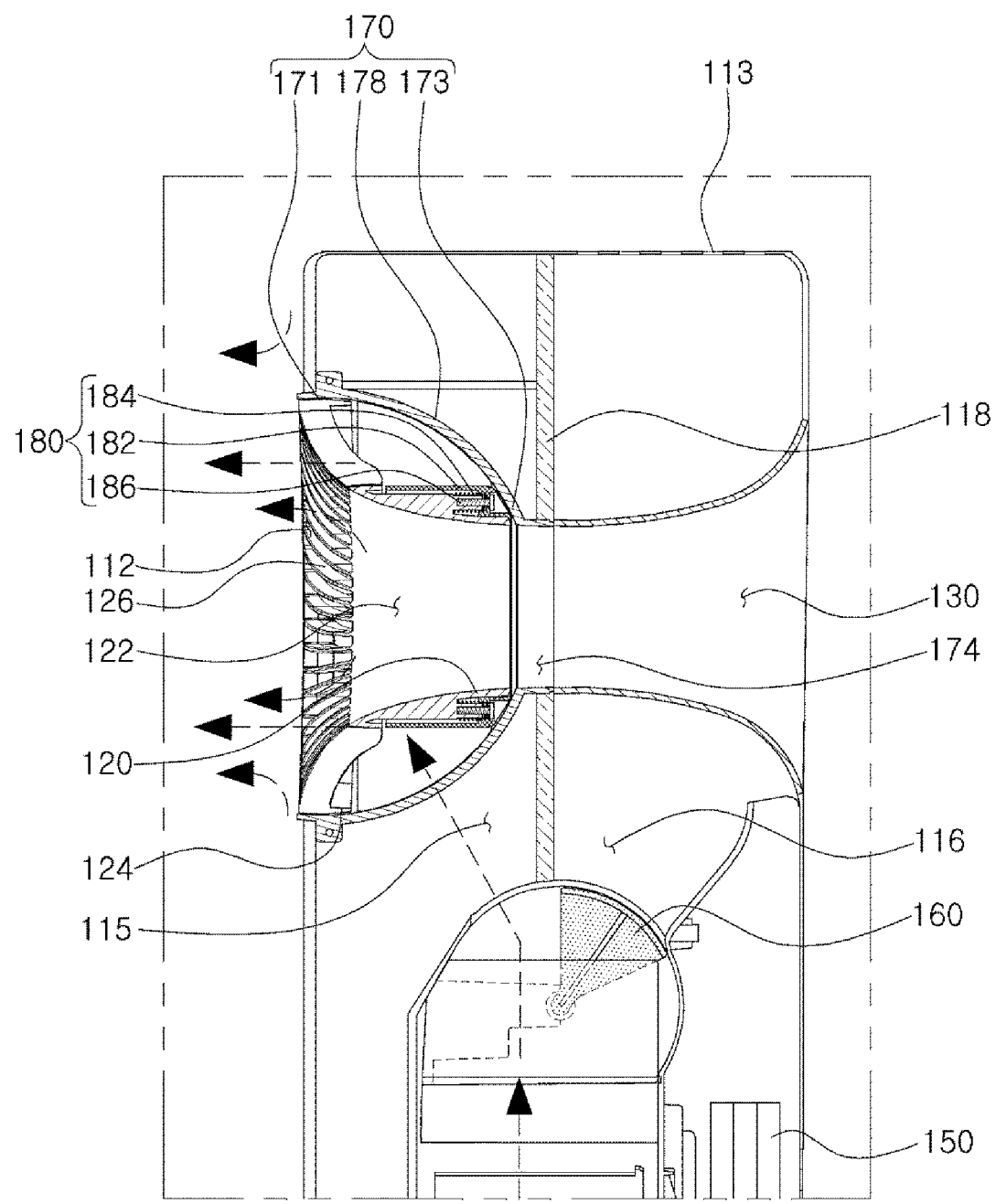

[FIG. 6]
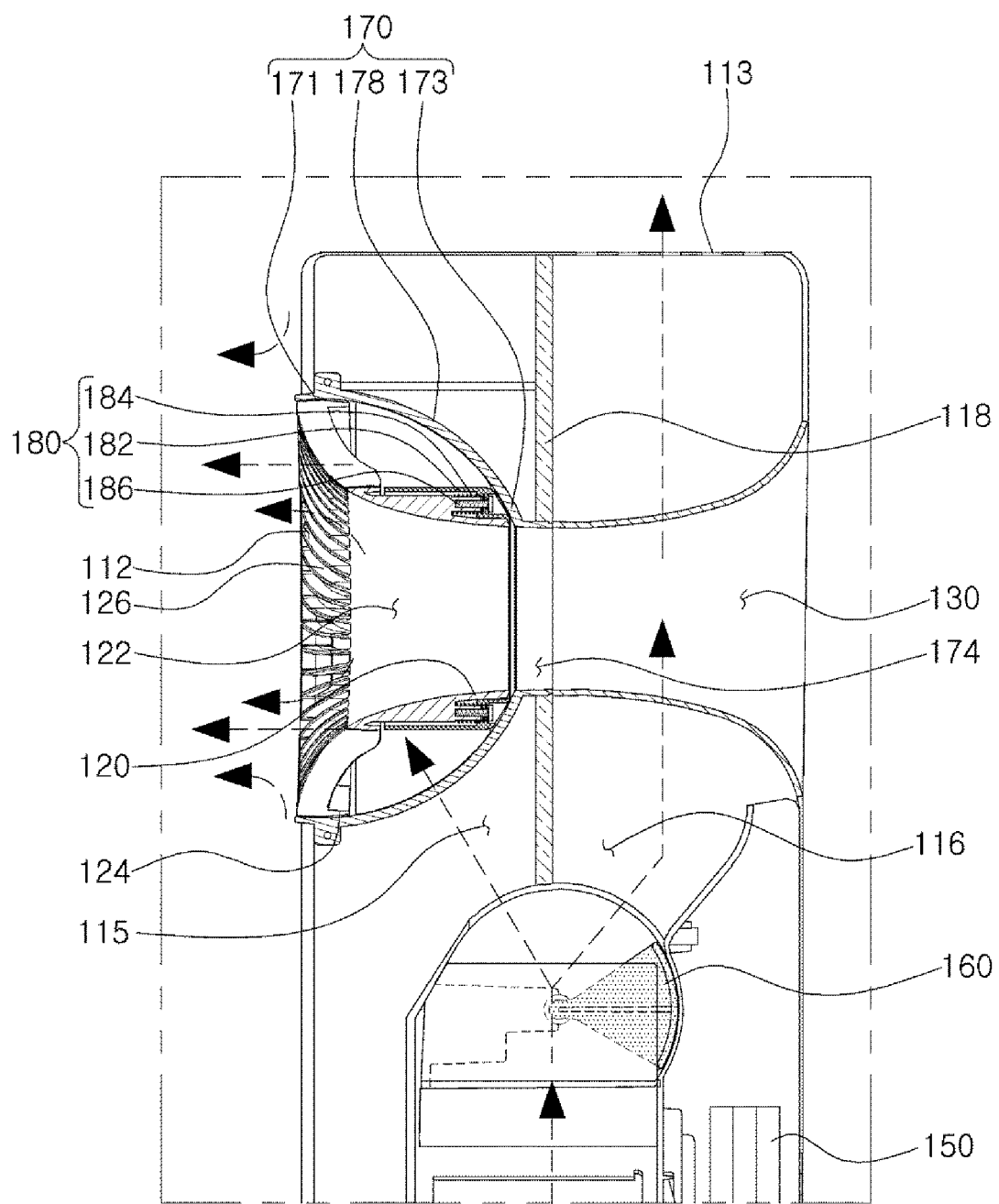

【FIG. 7A】
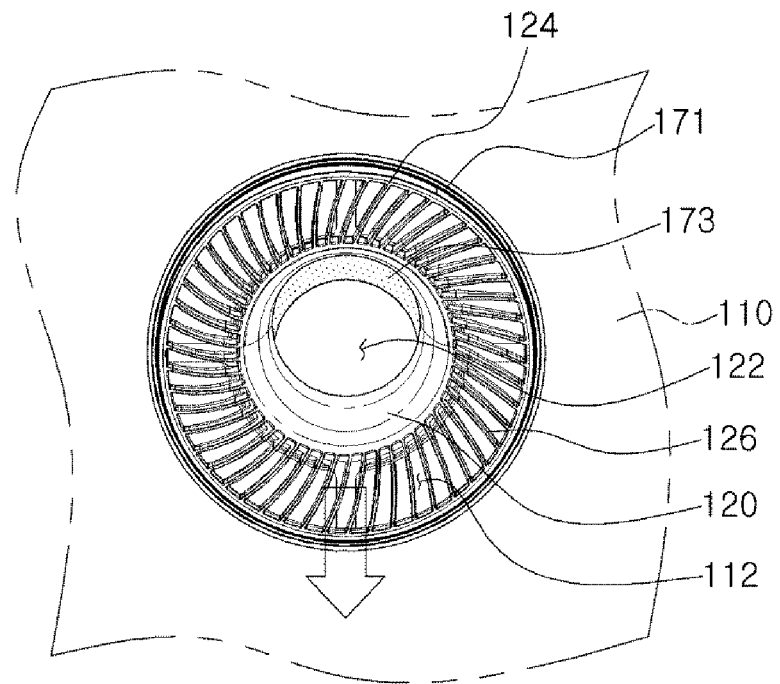
【FIG. 7B】
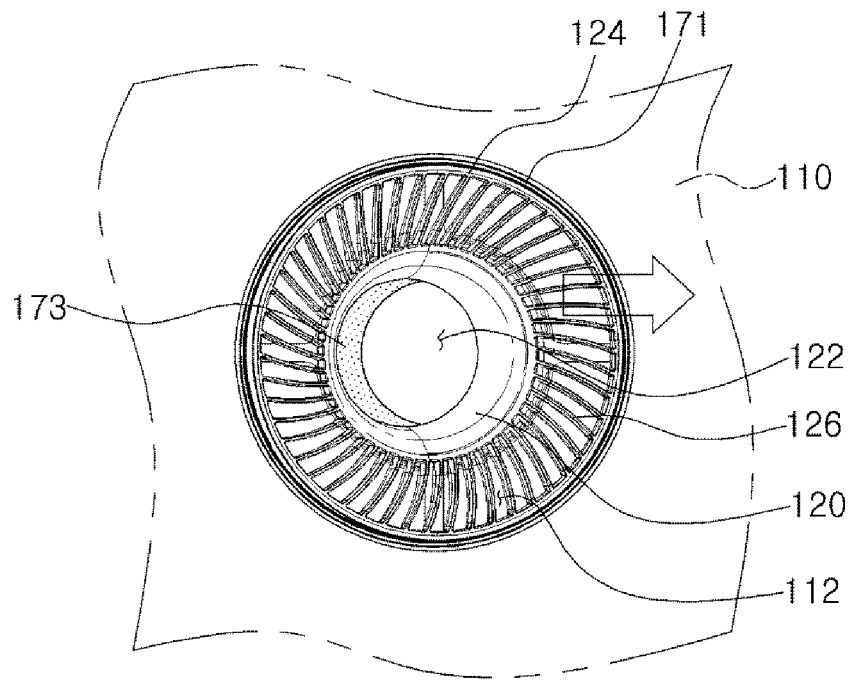

[FIG. 8]
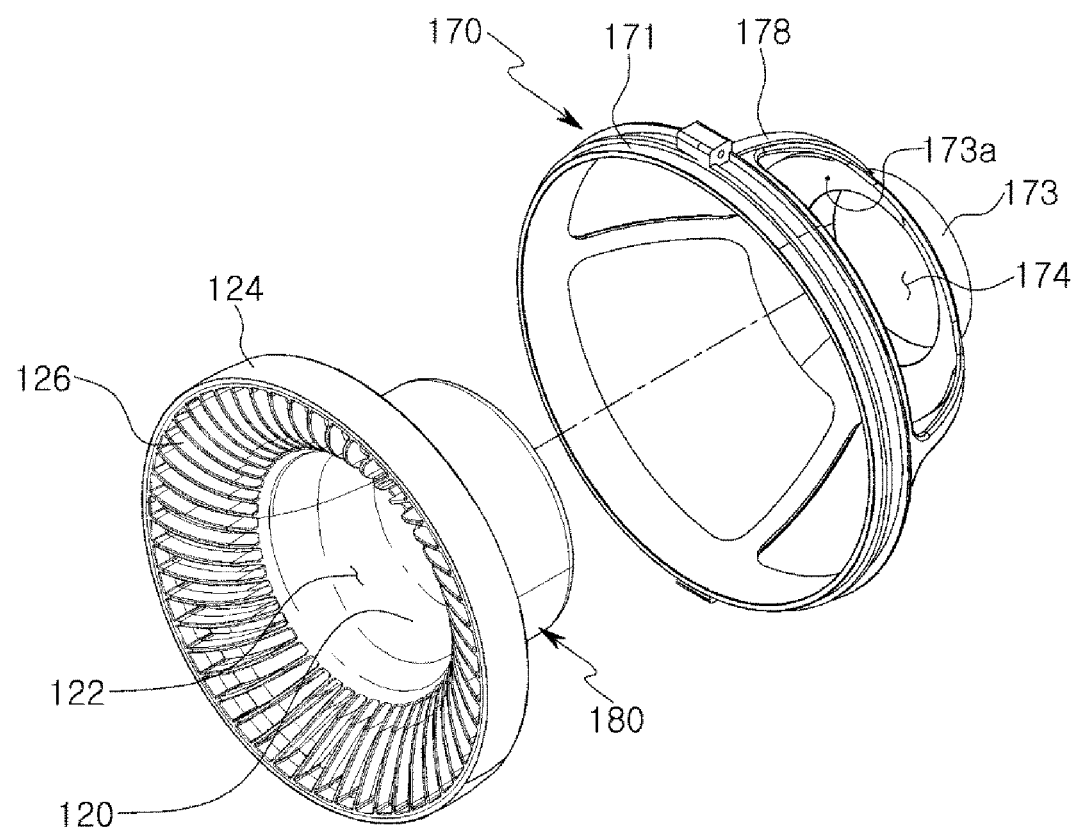

[FIG. 9]
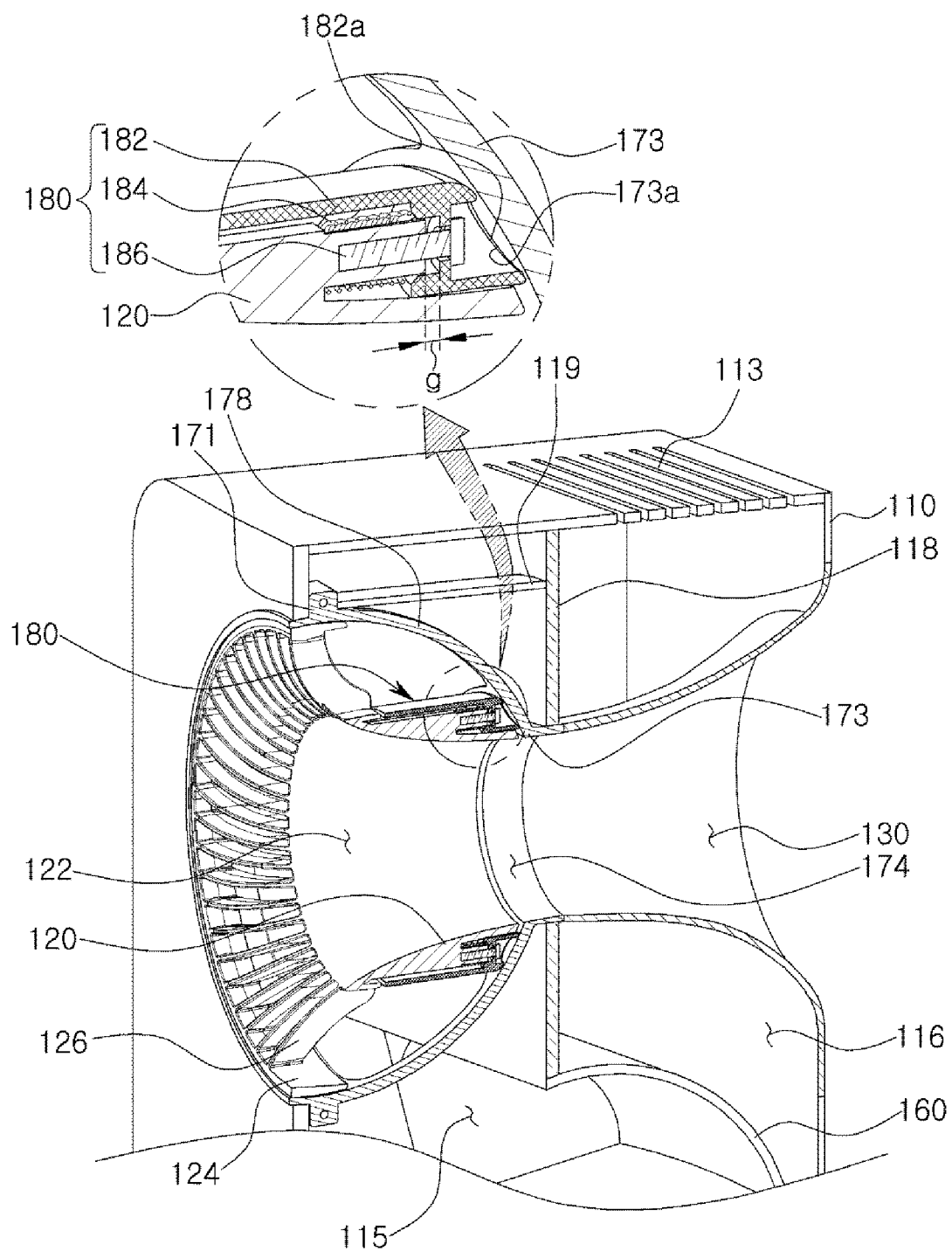

[FIG. 10]
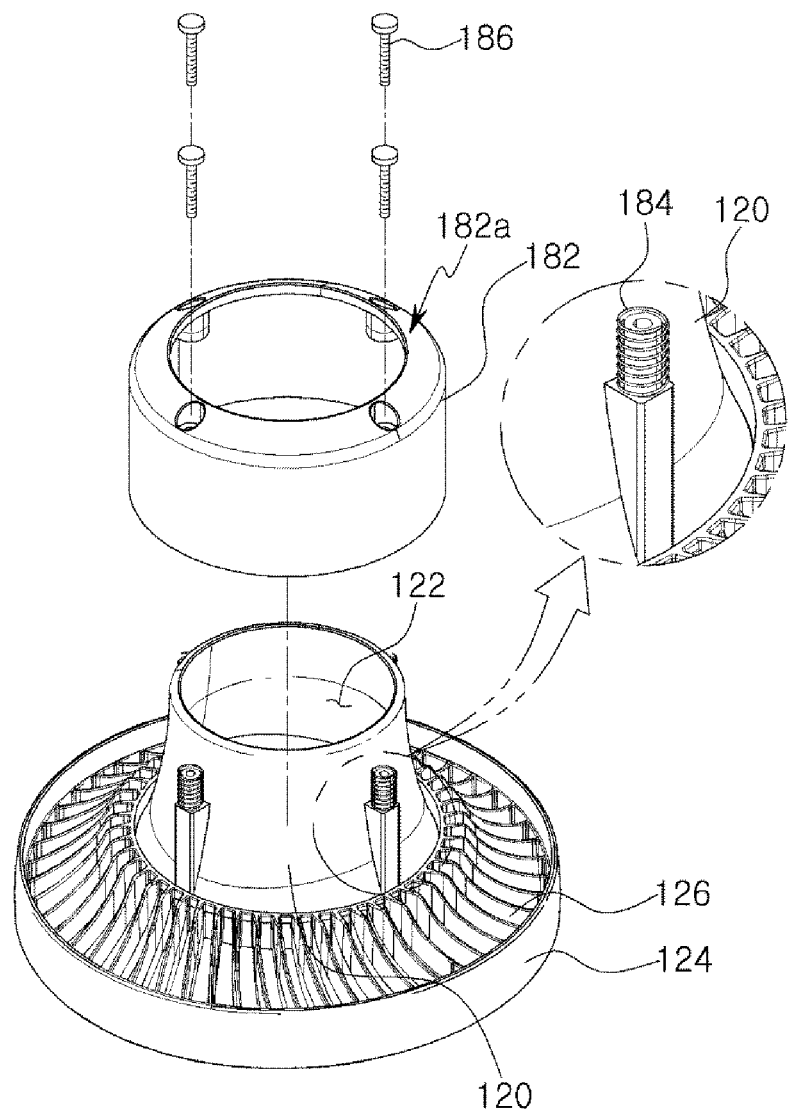

[FIG. 11]
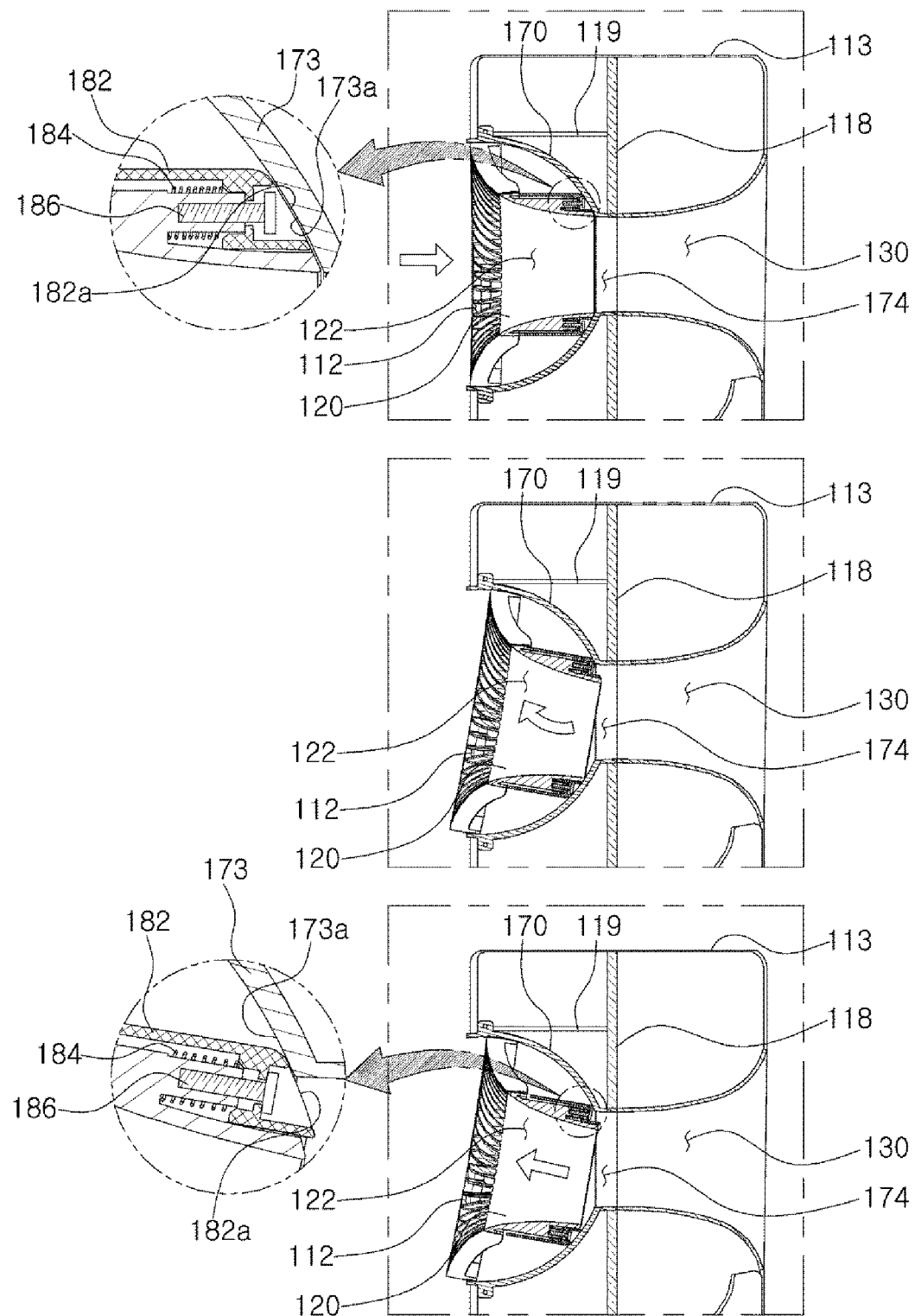

[FIG. 12]
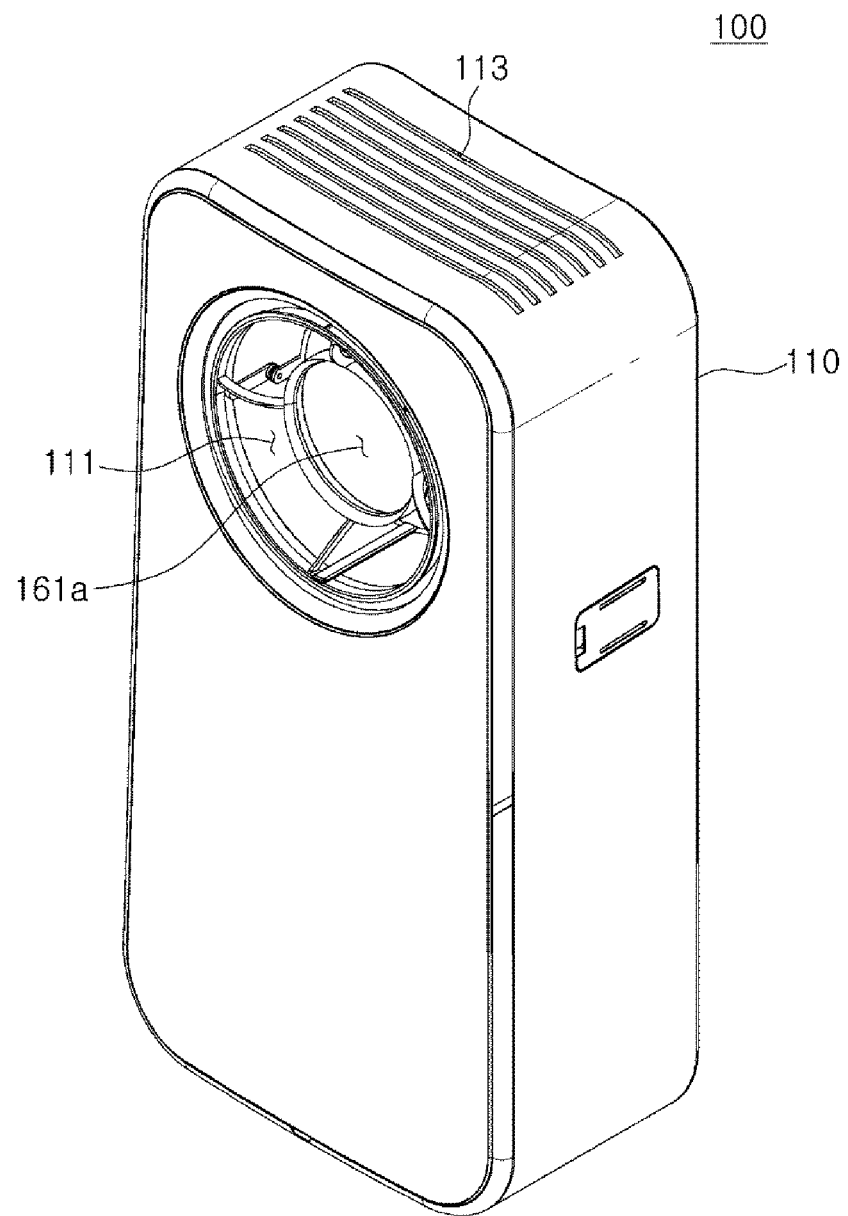

【FIG. 13】
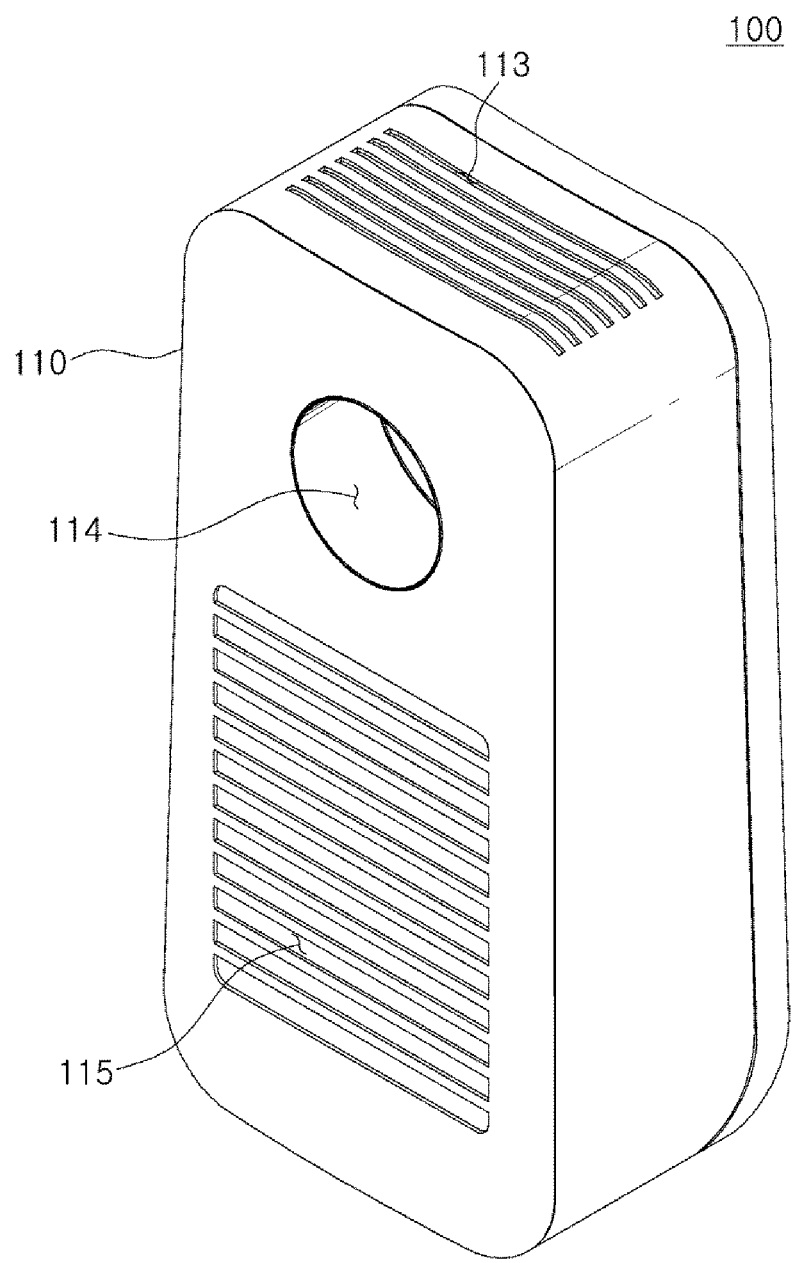

[FIG. 15]
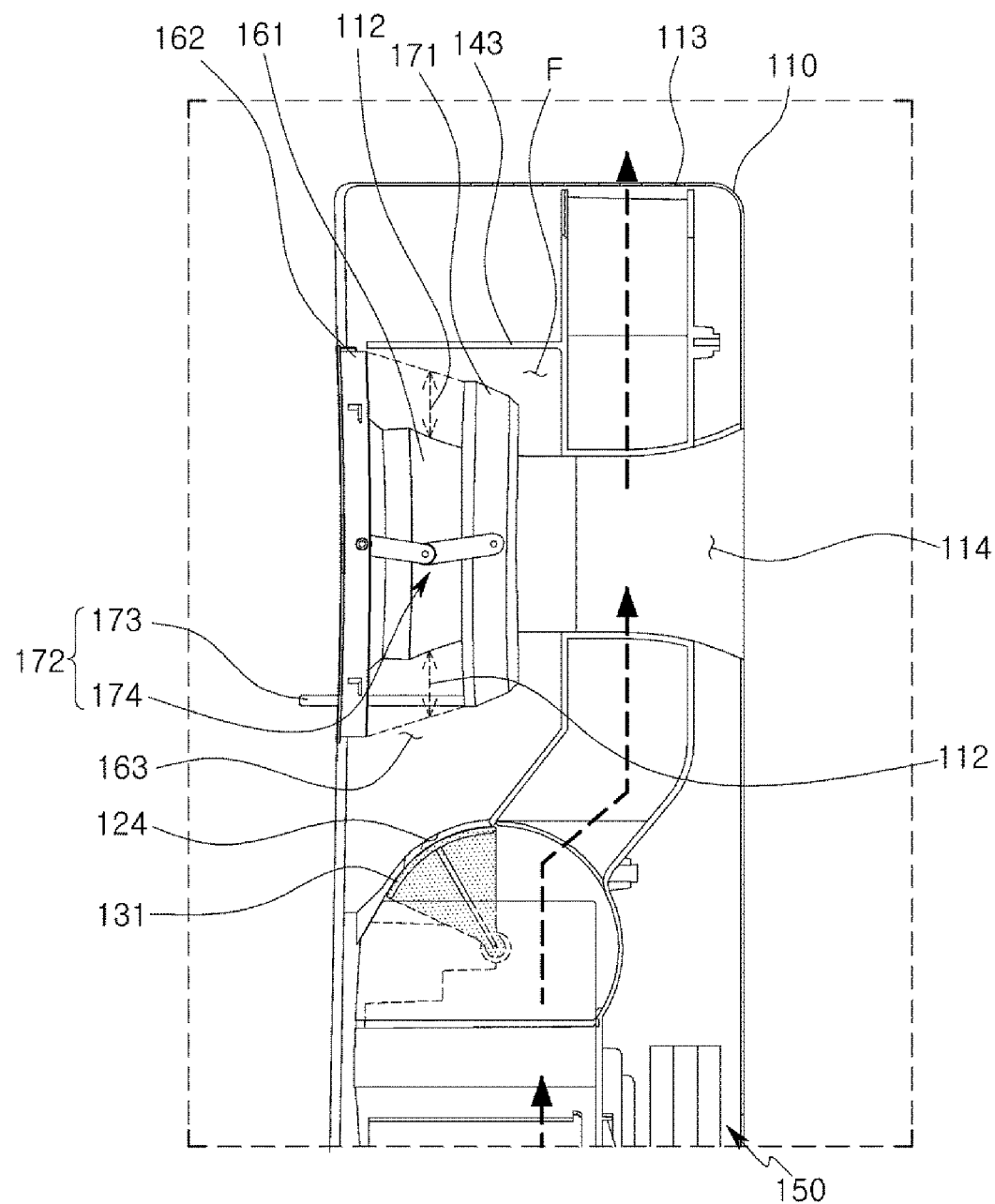

[FIG. 16]
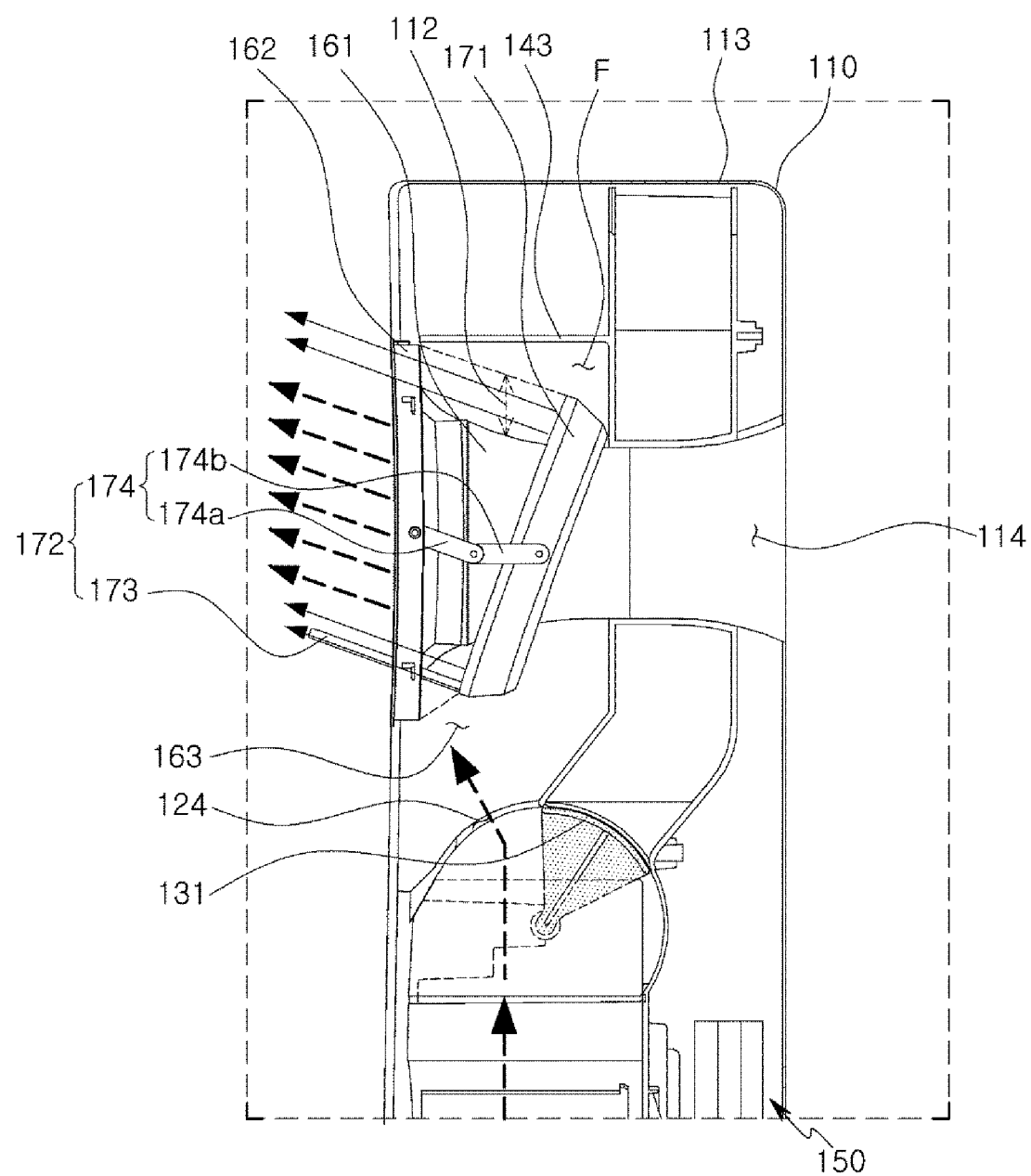

[FIG. 17]
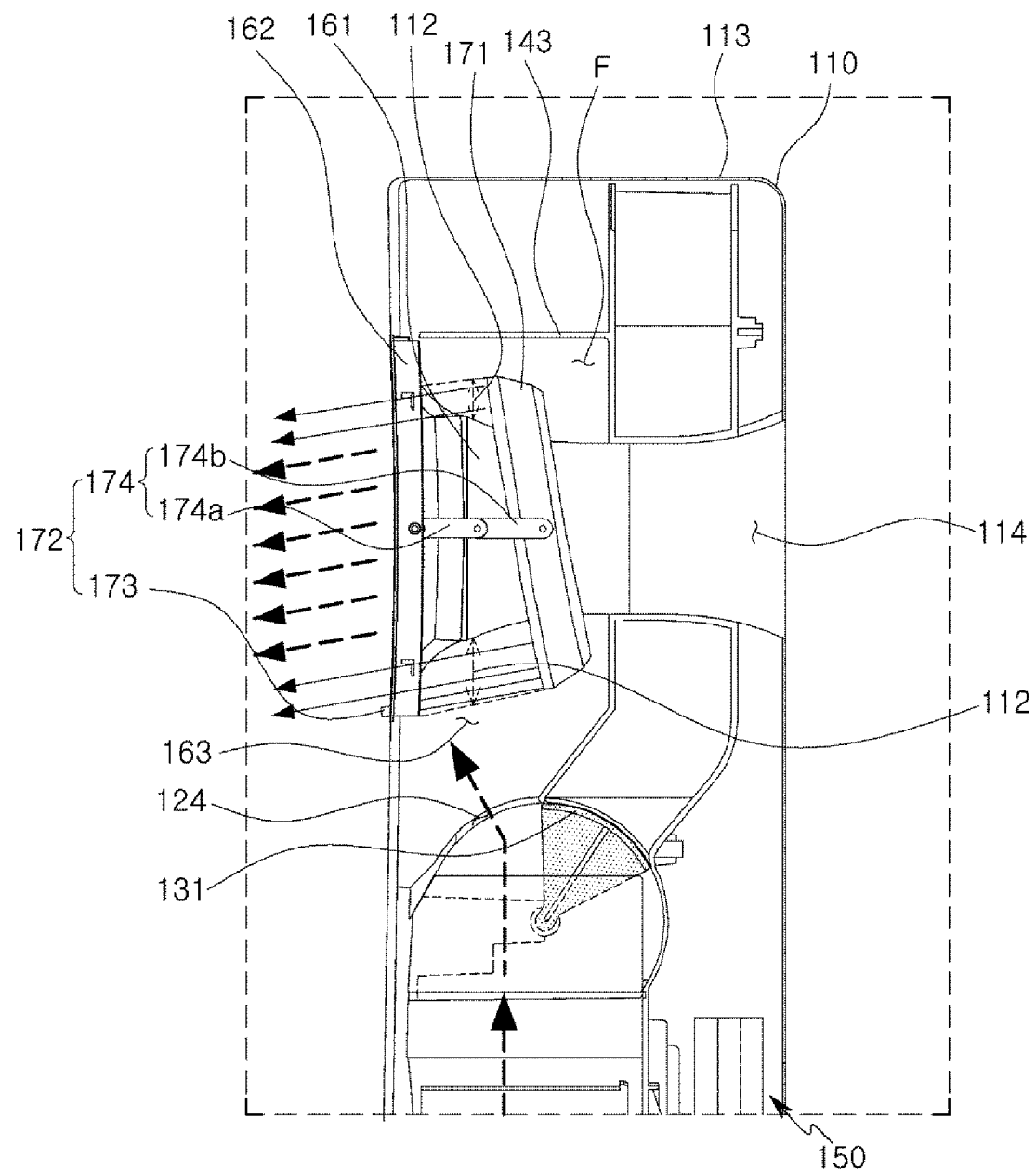

[FIG. 18]
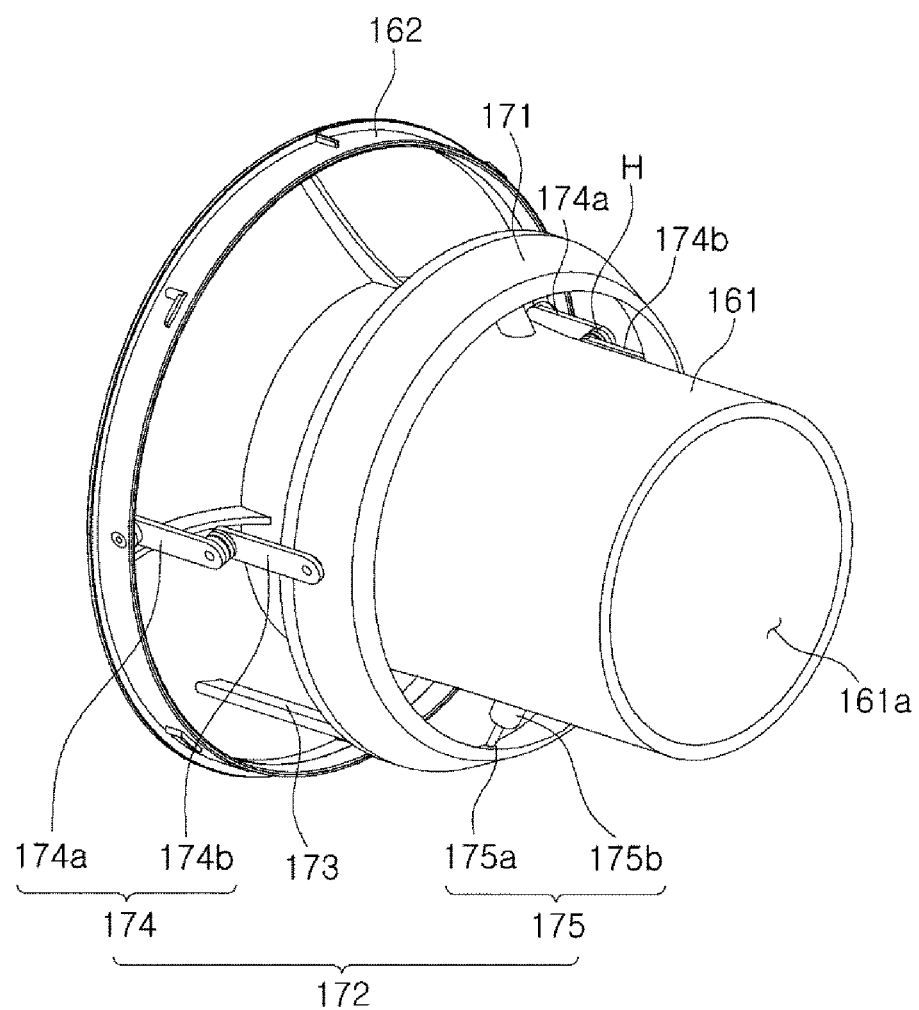

【FIG. 19】
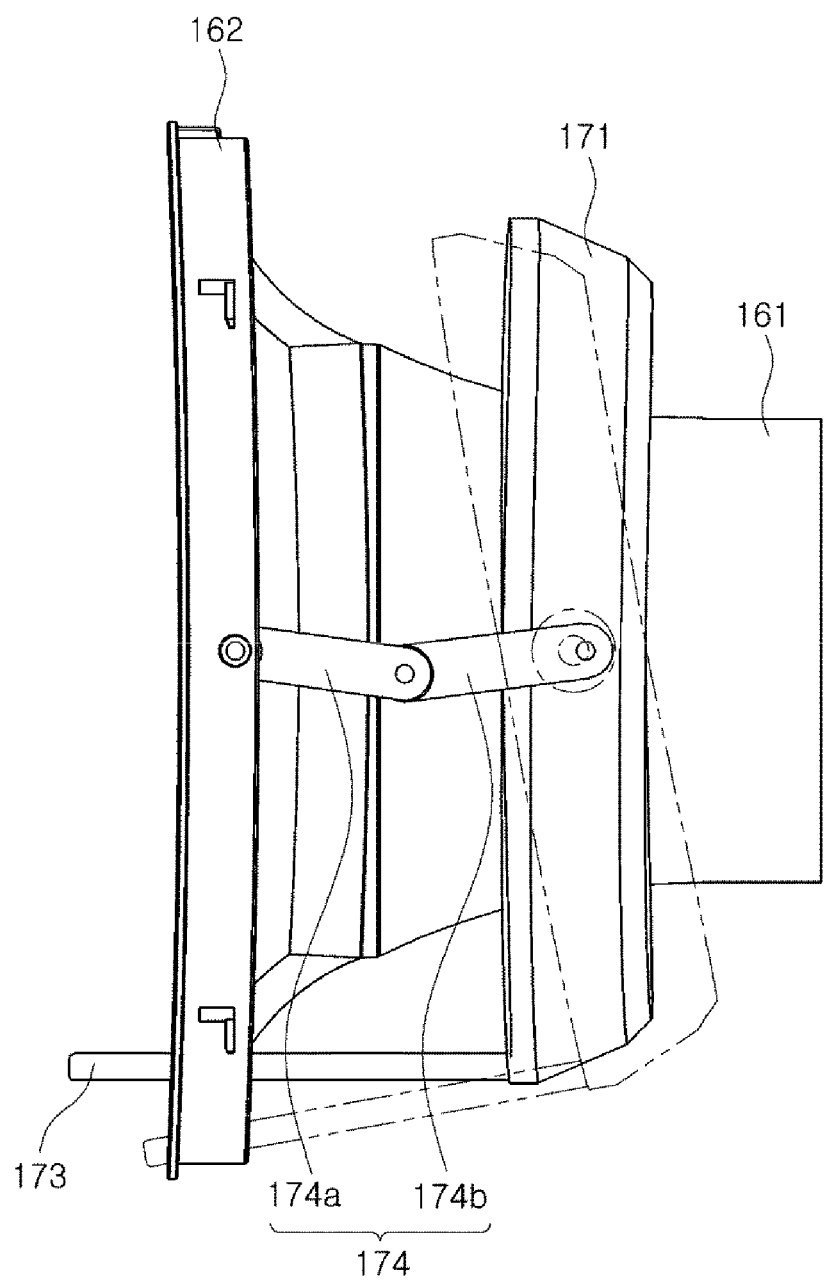

AIR PURIFIER CAPABLE OF ADJUSTING WIND DIRECTION

CROSS REFERENCE TO RELATED APPLICATIONS

This application is the U. S. National Stage entry of International Application Number PCT/KR2017/014268 filed under the Patent Cooperation Treaty having a filing date of Dec. 7, 2017, which claims priority to Korean Patent Application Ser. No. 10-2016-0166033 having a filing date of Dec. 7, 2016, and Korean Patent Application Ser. No. 10-2016-0180637 having a filing date of Dec. 28, 2016, which are incorporated herein by reference.

TECHNICAL FIELD

The present disclosure relates to a wind-direction adjustable air purifier.

BACKGROUND ART

Among products for discharging air, such as an air purifier, a humidifier, a dehumidifier, an air conditioner and the like, there is a product having an annular air outlet.

An annular air outlet may be employed in consideration of a product design or may be employed to discharge air in the form of rotating airflow.

However, such an annular air outlet has a disadvantage in that it is not easy to control a wind direction in terms of a structure.

Therefore, a product having an annular air outlet according to the prior art cannot control an air stream direction of an annular air outlet.

In addition, ordinary air purifiers have an air inlet in a housing forming an external appearance, and include an air purification filter and various functional filters in an internal space of the housing.

Further, indoor air is purified by drawing in polluted indoor air and dust through an air inlet, and then removing contaminants and dust from the drawn air.

Air purified inside the air purifier is discharged externally through an air outlet provided in a housing.

In this case, to maintain indoor air pleasantly, it is necessary to consider an indoor air circulation state, a discharge direction of purified air, and the like.

However, in the related art air purifier it may be difficult to adjust a discharge direction of purified air, and a user cannot directly adjust a discharge direction of air in a direction desired by the user, resulting in a problem in which usability and air circulation efficiency are lowered.

Korean Patent Laid-Open Publication Nos. 10-2014-0093158 and 10-2015-0092067 disclose an air conditioner having an annular air outlet, and Korean Patent Laid-Open Publication Nos. 10-2014-0093158 and 10-2015-0092067 disclose an air conditioner having a structure in which an air stream direction of an annular air outlet cannot be changed as described above.

DISCLOSURE

Technical Problem

An aspect of the present disclosure is to provide a wind direction adjustable air purifier capable of adjusting an air stream direction of an annular air outlet port, to prevent the occurrence of at least some of the problems of the related art as described above.

Technical Solution

According to an aspect of a first embodiment of the present disclosure, an air purifier capable of adjusting wind directions includes a housing having an air outlet port in one surface thereof; an air guide having a front end disposed in a center of the air outlet port and a rear end extending toward the other surface of the housing, in such a manner that the air outlet port has an annular shape, the air guide being coupled to an inside of the housing to be rotatable in a direction inclined with respect to an air discharge direction of the air outlet port; and a rotation-restraining portion for restraining rotation of the air guide by elastically supporting the air guide on the housing.

According to another aspect of the first embodiment of the present disclosure, an air purifier capable of adjusting wind directions includes a housing; an air outlet port having an annular shape, provided in the front of the housing; and an air guide having a front end disposed in a center of the air outlet port and a rear end extending toward the back of the housing, in such a manner that the air outlet port has the annular shape, the air guide including a hollow penetrating from the front to the back of the housing. The air guide is rotatable in a direction inclined with respect to an air discharge direction of the air outlet port, and is elastically supported in the housing to be restrained in rotation when external force is removed after rotation.

According to an aspect of a second embodiment of the present disclosure, an air purifier capable of adjusting wind directions includes a housing having a first outflow port; an air guiding unit provided in the housing and connected to the first outflow port to discharge purified air externally; and a direction switching unit provided in the housing and moved by a switching lever exposed externally of the housing to switch a direction of air externally discharged through the first outflow port.

In detail, the direction switching unit may include a direction switching member configured to have an inner surface spaced apart from an outer surface of the air guiding unit by a predetermined distance to form a second outflow port; and a switching driver connected to the direction switching member to move the direction switching member.

In more detail, the air guiding unit may include an air guide member connected to the first outflow port to extend to the inside of the housing, and having an outer surface facing the inner surface of the direction switching member; and a guide grille member provided in the first outflow port and connected to the air guide member inside the housing.

In detail, the switching driver may include a switching lever connected to the direction switching member to be exposed externally of the first outflow port; and a connection link connected to the guide grille member and the direction switching member to rotatably move.

In detail, the air guide member may be provided with a hollow and may be configured to be changed in an inner diameter.

In detail, the air guide member may have an inner diameter gradually increased toward the first outflow port.

In detail, the switching driver may further include at least one actuator provided on an outer surface of the air guide member and having a rotation axis connected to an inner surface of the direction switching member to rotate the direction switching member.

In more detail, the at least one actuator may be a step motor.

In detail, the connection link may include a first connection link connected to the guide grille member; and a second connection link rotatably connected to the direction switching member. The first connection link and the second connection link may be hingedly connected to each other.

Advantageous Effects

According to an embodiment of the present disclosure having the configuration as described above, an effect that an air stream direction of an annular air outlet port may be adjusted may be obtained.

In addition, the convenience for a user and an air circulation efficiency may be improved.

DESCRIPTION OF DRAWINGS

FIGS. 1 to 11 are views related to a first embodiment of the present disclosure.

FIG. 1 is a front perspective view of an air purifier according to an embodiment of the present disclosure.

FIG. 2 is a rear perspective view of the air purifier illustrated in FIG. 1.

FIG. 3 is a side cross-sectional view of the air purifier illustrated in FIG. 1.

FIG. 4 is a side sectional view of the air purifier illustrated in FIG. 1, illustrating a case in which air is discharged through an upper outlet port.

FIG. 5 is a side cross-sectional view of the air purifier illustrated in FIG. 1, illustrating a case in which air is discharged through an annular air outlet port.

FIG. 6 is a side sectional view of the air purifier illustrated in FIG. 1, illustrating a case in which air is simultaneously discharged through an annular air outlet port and an upper outlet port.

FIGS. 7A and 7B are operation diagrams illustrating an operation of adjusting an air stream direction of an annular air outlet port provided in the air purifier illustrated in FIG. 1.

FIG. 8 is an exploded perspective view of an air guide and a rotation guide included in the air purifier illustrated in FIG. 1.

FIG. 9 is a cross-sectional perspective view partially illustrating an upper portion of the air purifier illustrated in FIG. 1.

FIG. 10 is an exploded perspective view of the air guide and a rotation-restraining portion included in the air purifier illustrated in FIG. 1.

FIG. 11 is a side cross-sectional view illustrating a method of adjusting an air stream direction of the air purifier illustrated in FIG. 1.

FIGS. 12 to 19 are views related to a second embodiment of the present disclosure.

FIG. 12 is a front perspective view of an air purifier capable of adjusting wind directions according to an embodiment of the present disclosure.

FIG. 13 is a rear perspective view of the air purifier capable of adjusting wind directions according to an embodiment of the present disclosure.

FIG. 14 is an exploded perspective view of the air purifier capable of adjusting wind directions according to an embodiment of the present disclosure.

FIGS. 15 to 17 illustrate an air stream of the air purifier capable of adjusting wind directions according to an embodiment of the present disclosure.

FIG. 18 is a rear perspective view of an air guiding unit and a direction switching unit of the air purifier capable of adjusting wind directions according to an embodiment of the present disclosure.

FIG. 19 is an operational state diagram of the air guiding unit and the direction switching unit of the air purifier capable of adjusting wind directions according to an embodiment of the present disclosure.

BEST MODE

Figure 14:
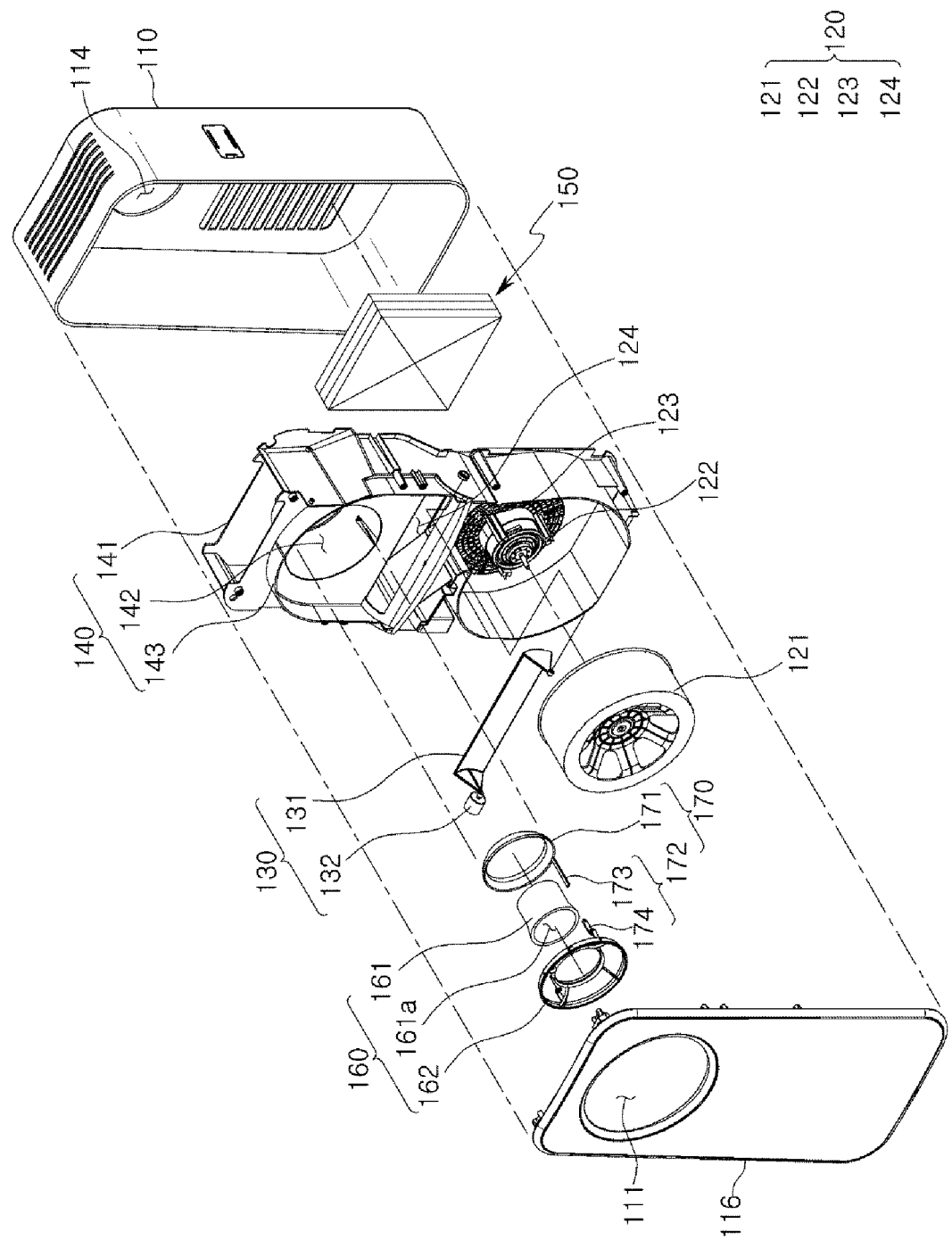

The terminology used herein is for the purpose of describing particular embodiments only and is not intended to be limiting of the present disclosure. Furthermore, the singular forms in this specification include plural expressions unless the context clearly dictates otherwise.

The wind-direction adjustable air purifier according to an embodiment of the present disclosure largely includes two embodiments, and is divided into first and second embodiments. FIGS. 1 to 11 are views related to a first embodiment of the present disclosure, and FIGS. 12 to 19 are views related to a second embodiment of the present disclosure.

Even when reference numerals of the first embodiment illustrated in FIGS. 1 to 11 and reference numerals of the second embodiment illustrated in FIGS. 12 to 19 are denoted by the same reference numerals, the description will be made on the assumption that they are different from each other.

First Embodiment

Hereinafter, a first embodiment of the present disclosure will be described with reference to FIGS. 1 to 11.

First, the configuration and overall structure of an air purifier 100 according to an embodiment of the present disclosure and a flow path switching operation will be described with reference to FIGS. 1 to 6.

As illustrated in FIGS. 1 to 6, the air purifier 100 according to an embodiment of the present disclosure may include a housing 110, an air guide 120, an air hole 130, an air discharge fan 140, an air purifying filter 150, and a flow path switching unit 160.

The housing 110 may constitute an external appearance of the air purifier 100 according to an embodiment of the present disclosure, and may be provided with an air inlet port 111 through which external air flows into the housing 110, an air outlet port 112 in the front of the housing, and an upper outlet port 113 in an upper end thereof.

The air outlet port 112 and the upper outlet port 113 may constitute a passage through which air drawn into the housing 110 is discharged to the outside of the housing 110.

In this case, the air outlet port 112 may be formed in an annular shape due to the air guide 120 to be described later.

In addition, in an embodiment, the air inlet port 111 may be formed in the back of the housing 110, but the position thereof is not limited thereto. The air inlet port may also be formed in at least one of the front, a side surface, and the back of the housing 110.

In addition, a partition wall 118 may be provided in the housing 110 to separate the air outlet port 112 and the upper outlet port 113.

The partition wall 118 extends from the upper outlet port 113 in a direction toward the air discharge fan 140, to form a front discharge passage 115 connected between the air discharge fan 140 and the air outlet port 112 and an upper discharge passage 116 connected between the air discharge fan 140 and the upper outlet port 113, inside the housing 110.

The air guide 120 is disposed inside the housing 110, and has a front end disposed in a central portion of the air outlet port 112 and a rear end extending toward the other surface of the housing 110, in such a manner that the air outlet port 112 has an annular shape.

The air guide 120 as described above may be disposed in the front discharge passage 115 inside the housing 110 to guide the air flowing in the front discharge passage 115 to the air outlet port 112.

In an embodiment, the air guide 120 may be configured to have a hollow 122 penetrating from the front of the housing 110 to the back thereof, to have a cylindrical shape.

Also, in an embodiment, the air guide 120 may communicate with the air hole 130 to be described later to form a portion of a hole penetrating through the housing 110 from the front to the back thereof, but the present disclosure is not limited thereto. The rear end of the air guide 120 may also be shielded by the partition wall 118.

On the other hand, in an embodiment, the partition wall 118 may be provided with an enclosure 119, surrounding an upper half of the air guide 120 at an interval, to guide the air flowing upwardly of the air guide 120 to the air outlet port 112, and extending toward the air outlet port 112.

The air hole 130 is formed in the housing 110 and communicates with the hollow 122 of the air guide 120 to extend to the back of the housing 110. To this end, a cylindrical or trumpet-shaped structure forming the air hole 130 may be formed to traverse the upper discharge passage 116 in the interior of the housing 110.

On the other hand, a hole penetrating from the front to the back of the housing 110 may be formed in the housing 110 as the hollow 122 of the air guide 120 and the air hole 130 are connected to each other.

In this structure, when air is discharged through the air outlet port 112, the air pressure around the air outlet port 112 is reduced, and thus, the air in the back of the housing 110 may join the air discharged from the air outlet port 112 to flow toward the front of the housing 110 through the hollow 122 of the air guide 120 and the air hole 130.

Therefore, in the case of the air purifier 100 according to an embodiment of the present disclosure, for example, when air is discharged to the air outlet port 112 having an annular shape, a flow may be generated in the ambient air of the air outlet port 112, and as a result, the air discharge amount may increase as illustrated in FIGS. 5 and 6.

The air discharge fan 140 is provided inside the housing 110 and draws air from the outside of the housing 110 through the air inlet port 111 in operation and then discharges the air to the air outlet port 112 or the upper outlet port 113.

In an embodiment, the air discharge fan 140 may be a centrifugal fan disposed in an entrance side of the front discharge passage 115 and the upper discharge passage 116 as illustrated in FIGS. 3 to 6, but the configuration thereof is not limited thereto. The position and type of the air discharge fan 140 may be changed.

The air purifying filter 150 is provided between the air inlet port 111 and the air discharge fan 140 to purify air drawn into the air inlet port ill.

In an example, the air purifying filter 150 may be configured to include a prefilter, a deodorizing filter, a sterilizing filter, an activated carbon filter, a HEPA filter, and the like.

In addition, although not illustrated, the air purifier 100 according to an embodiment of the present disclosure may also include a humidifying filter for humidifying air between the air purifying filter 150 and the air discharge fan 140, or a dehumidifying unit for dehumidifying air.

The flow path switching unit 160 may guide air discharged by the air discharge fan 140 to at least one of the air outlet port 112 and the upper outlet port 113.

In an embodiment, the flow path switching unit 160 may be provided inside the housing 110 to open and close the front discharge passage 115 and the upper discharge passage 116.

For example, the flow path switching unit 160 may be configured to selectively open or close the front discharge passage 115 and the upper discharge passage 116 by rotating as illustrated in FIGS. 2 to 6, but the configuration thereof is not limited thereto.

On the other hand, in a case which the flow path switching unit 160 closes the front discharge passage 115 and opens the upper discharge passage 116 as illustrated in FIG. 4, the air discharged by the air discharge fan 140 may be discharged to the upper outlet port 113.

Further, in a case which the flow path switching unit 160 opens the front discharge passage 115 and closes the upper discharge passage 116 as illustrated in FIG. 5, the air discharged by the air discharge fan 140 may be discharged to the air outlet port 112 having an annular shape.

As illustrated in FIG. 6, in a case in which the front discharge passage 115 and the upper discharge passage 116 are both opened by the flow path switching unit 160, a portion of the air discharged by the air discharge fan 140 is discharged to the upper outlet port 113 and the remainder may be discharged to the air outlet port 112.

Next, with reference to FIGS. 7A to 11, an air stream direction adjusting structure of the air outlet port 112 having an annular shape will be described.

The air purifier 100 according to an embodiment of the present disclosure may be configured in such a manner that the air guide 120 may rotate in a direction inclined with respect to an air discharge direction of the air outlet port 112.

As described above, in the case in which the air guide 120 is rotated to be inclined with respect to the air discharge direction, the air discharged to the air outlet port 112 along an outer circumferential surface of the air guide 120 may be discharged in a direction toward a front end of the air guide 120.

To implement such an operation, the air purifier 100 according to an embodiment of the present disclosure may include a rotation guide 170 and a rotation-restraining portion 190 as illustrated in FIGS. 7A to 11.

The rotation guide 170 is fixed to the inside of the housing 110, and may rotatably support the air guide 120 in the housing 110. For example, the rotation guide 170 may function as a medium for coupling the air guide 120 to the housing 110.

In this case, the air guide 120 may be rotatably coupled to the rotation guide 170 to be rotatable in a free direction including upwardly, downwardly, left, right and oblique directions.

A detailed structure of the air guide 120 and the rotation guide 170 to implement such operation will be described.

In an embodiment, the air guide 120 is provided with a rim portion 124 formed on a front end thereof, the rim portion having an annular shape corresponding to a shape of the air outlet port 112 and being disposed in the air outlet port 112. The air guide 120 is also provided with a plurality of guide blades 126 connected between the rim portion 124 and the air guide 120, along an edge of the air guide 120.

With this structure, the plurality of guide blades 126 may be disposed in the air outlet port 112 having an annular shape, and the air discharged through the air outlet port 112 is discharged through space between the plurality of guide blades 126.

In an embodiment, the guide blades 126 are formed in an inclined or curved shape in the circumferential direction of the air outlet port 112 as illustrated in FIGS. 7A and 7B and FIG. 8, such that the air discharged through the air outlet port 112 may be discharged in the form of rotating airflow.

For reference, an air stream in the form of rotating air airflow has an advantage in that a room air circulation performance is relatively high since a reach distance of the air is longer than an air stream in the form of straight line.

On the other hand, in an embodiment, the rotation guide 170 may be composed of an annular frame 171, a support frame 173, and a connection frame 178.

The annular frame 171 hermetically surrounds the outer peripheral surface of the rim portion 124 of the air guide 120 and may be fixed to the outer periphery of the air outlet port 112. In an embodiment, an outer circumferential surface of the annular frame 171 may be coupled to a front panel of the housing 110, forming the air outlet port 112, while maintaining airtightness.

In addition, the annular frame 171 as described above may support a front end of the rim portion 124 against elastic restoring force of an elastic member 184 of the rotation-restraining portion 180 to be described later.

To this end, in an embodiment, an inner side surface of the annular frame 171 may be formed concavely curved in a thickness direction, and an outer circumferential surface of the rim portion 124 may be formed convexly curved in the thickness direction at the same curvature as a curvature of the inner side surface of the annular frame 171. With this structure, the rim portion 124 may slide on the inner side surface of the annular frame 171 to be rotated in various directions.

Further, in this case, an inner diameter of a foremost end of the annular frame 171 is configured to be less than a maximum outer diameter of the rim portion 124, so that the rim portion 124 is not separated from the annular frame 171 forwardly thereof at any rotational angle, and a fastening state thereof to the annular frame 171 may be maintained. In this case, the annular frame 171 may support the rim portion 124 by resisting the load applied to the front portion of the housing 110 by the rim portion 124.

To implement this operation, in an embodiment, the inner side surface of the annular frame 171 may be formed as a curved surface that conforms to a portion of the surface of a sphere having a greatest outer diameter of the rim portion 124 as a diameter thereof. In this case, a foremost end of the annular frame 171 is formed to extend to a position deviating from a center of the sphere, in such a manner that an inner diameter of the foremost end of the annular frame 171 is smaller than a maximum inner diameter of the annular frame 171.

Thus, the rim portion 124 inserted into the inside of the annular frame 171 may be prevented from being released from the annular frame 171 forwardly thereof at any rotational angle, as at least symmetrical two portions thereof are caught in the foremost end of the annular frame 171.

For reference, FIG. 11 illustrates a state in which a lower end of the rim portion 124 deviates from the foremost end of the annular frame 171 in the drawing illustrating a state in which the air guide 120 rotates, but in this case, since an upper end and the left and right sides of the rim portion 124 are supported by the annular frame 171, the air guide 120 is prevented from being detached from the annular frame 171.

The support frame 173 may be fixed to the partition wall 118 provided in the housing 110 and may support a pressing frame 182 against elastic restoring force of the elastic member 184 provided in the rotation-restraining portion 180.

In this structure, when the air guide 120 is rotated, a contact surface 182a of the rear end of the pressing frame 182, which is fastened to surround the air guide 120, may slide on a contacted surface 173a of the support frame 173.

In this case, the contact surface 182a of the pressing frame 182 and the contacted surface 173a of the support frame 173 may be configured to maintain airtightness therebetween during rotation of the air guide 120.

To this end, in an embodiment, the contacted surface 173a of the support frame 173 contacting the contact surface 182a of the pressing frame 182 may be formed as a curved surface conforming to a turning locus of a rear end of the pressing frame 182.

In an example, the contacted surface 173a of the support frame 173 and the contact surface 182a of the pressing frame 182 may be formed as a curved surface conforming to a portion of a surface of a sphere of which a distance from the center of the air outlet port 112 to the center of the support frame 173 is a radius.

Thus, the contact surface 182a of the pressing frame 182 and the contacted surface 173a of the support frame 173 may be maintained in a surface contact state at any rotational angle of the air guide 120 during rotation of the air guide 120, to maintain airtightness therebetween.

In this case, a distance from the center of the air outlet port 112 to the center of the support frame 173 may be the same as a maximum radius of the rim portion 124. For example, curvatures of the curved surface of the contacted surface 173a of the support frame 173, the curved surface of the contact surface 182a of the pressing frame 182, and a curved surface of an inner surface of the annular frame 171 may all be designed to be the same as each other.

In this structure, when the air guide 120 is rotated, the contacted surface 173a may contact the contact surface 182a of the pressing frame 182 on an entire perimeter of the hollow 122.

On the other hand, in a case in which the air purifier 100 according to an embodiment of the present disclosure has a hole penetrating from the front to the rear thereof as described above, the support frame 173 may be provided with a through hole 174 formed therein, communicating the hollow 122 of the air guide 120 and the air hole 130 of the housing 110.

The connection frame 178 is formed to connect the annular frame 171 and the support frame 173 to each other, such that the rotation guide 170 may be formed as a single integral component. In this case, the position of the annular frame and the support frame may be fixed against elastic restoring force of the elastic member 184.

In the case of the connection frame 178, in an embodiment, a plurality of connection frames may be provided along the perimeters of the annular frame 171 and the support frame 173, and may be configured to have a relatively reduced thickness and a relatively wide interval therebetween to significantly reduce interference with the air flowing from the front discharge passage 115 to the air outlet port 112.

On the other hand, in an embodiment, the hollow 122 of the air guide 120 and the air hole 130 of the housing 110 may be maintained in a communicating state with respect to each other at all times to allow for flow of air even at any rotational angle of the air guide 120 when the air guide 120 rotates.

To this end, the air guide 120 may be configured to rotate within a range in which the hollow 122 and the air hole 130 communicate with each other. For example, the air guide 120 may be rotated within a range in which the hollow 122 and the air hole 130 overlap at least partially.

Therefore, even when the air guide 120 is rotated to adjust an air stream direction, the air in the back of the housing 110 joins the air discharged from the air out port 112 through the air hole 130 and the hollow 122.

On the other hand, although not illustrated, to limit a rotation angle of the air guide 120, a stopper structure (not illustrated) for restricting the rotation of the air guide 120 at a predetermined rotation angle or more of the air guide 120 may also be provided in the rotation guide 170.

The rotation-restraining portion 180 may restrict rotation of the air guide 120, such that an adjusted rotation position of the air guide 120 may be maintained. For example, the rotation restricting portion 180 may elastically support the air guide 120 in the housing 110 to restrict the rotation of the air guide 120, in such a manner that the rotation position of the air guide 120, which is adjusted by a user, is prevented from being changed by wind pressure of the air discharged to the air outlet port 112 or by vibrations generated in the housing 110.

In an embodiment, the rotation-restraining portion 180 may include a pressing frame 182 and an elastic member 184.

The pressing frame 182 is fastened to an outer circumferential surface of the air guide 120 in the form of a double pipe to be movable in a longitudinal direction of the air guide 120, and may be configured in such a manner that the contact surface 182a of a rear end thereof is in contact with the partition wall 118 inside the housing 110.

The contact surface 182a of the rear end of the pressing frame 182 is configured to contact the support frame 173 fixed to the partition wall 118 as described above, to indirectly contact the partition wall 118 via the support frame 173, but the configuration thereof is not limited thereto. For example, the same shape as a shape of the contacted surface 173a of the support frame 117 may be formed on the partition wall 118 itself, in such a manner that the contact surface 182a of the pressing frame 182 is in direction contact with the partition wall 118.

Further, in an embodiment, the pressing frame 182 may be configured to have a cylindrical shape surrounding the outer circumferential surface of the air guide 120. In this case, the pressing frame 182 may be configured to be slidable in a state of being in close contact with the outer circumferential surface of the air guide, to prevent air from leaking into a space between the pressing frame 182 and the air guide 120.

On the other hand, if the contact surface 182a of the pressing frame 182 is formed to have a thin thickness, and in a case in which the air guide 120 is rotated at a predetermined angle or more, a portion of the pressing frame 182 may be disposed to traverse the through hole of the support frame. In this case, airtightness between the pressing frame 182 and the support frame may be impaired. Thus, a portion of the air flowing into the front discharge passage 115 may leak into the air hole 130 through a gap between the pressing frame 182 and the support frame 173.

Accordingly, when the air guide 120 is rotated, to secure a rotation angle of the air guide 120 for control of an air stream direction in a state in which airtightness between the air guide, the outside of the pressing frame 182 and the air hole 130 is maintained, in an embodiment, the contact surface 182a of the pressing frame 182 may be formed to extend in a radial direction of the support frame 173.

In this configuration, the air guide 120 may be rotated by the thickness of the contact surface 182a of the pressing frame 182 in the rotation guide 170 as illustrated in FIG. 11.

On the other hand, in an embodiment, the pressing frame 182 may be coupled to the air guide 120 via fastening bolts 186 as illustrated in FIGS. 9 and 10.

The fastening bolt 186 is screwed to the air guide 120 and is fastened to the pressing frame 182 to be movable in the longitudinal direction in such a manner that the head of the bolt may prevent separation of the pressing frame 182 and the air guide 120.

In this case, as illustrated in FIG. 9, a gap G is formed between an end of a portion of the air guide 120, to which the fastening bolt 186 is fastened, and a body of the pressing frame 182 facing the end of the air guide, in such a manner that the air guide 120 may be pressed and moved in a direction toward the support frame 173 when the air guide 120 is rotated.

The elastic member 184 is provided between the pressing frame 182 and the air guide 120 to apply elastic restoring force to the air guide 120 in a direction toward the air outlet portion 112.

The elastic member 184 presses the pressing frame 182 in a direction toward the support frame 173 and presses the air guide 120 in a direction toward the air outlet port 112.

Thus, the pressing frame 182 may be pressed and fixed to the support frame 173 and the air guide 120 may be pressed and fixed to the annular frame 171 as the rim portion 124 is supported on the foremost end of the annular frame 171, by the elastic restoring force of the elastic member 184, when external force against the elastic member 184 is removed.

As a result, the pressing frame 182 is pressed against the support frame 173 and the air guide 120 is pressed against the annular frame 171, such that the rotation of the air guide 120 may be restrained.

In the air stream direction adjusting structure of the air outlet port 112 having an annular shape as described above, since the air guide 120 is rotatably disposed inside the rotation guide 170 to be rotatable in a free direction, for example, in an upward and downward direction, a lateral direction, and a diagonal direction, and is not fastened to a separate rotary shaft, there is an advantage in that the air guide 120 has a relatively high degree of freedom in the rotation direction and the rotation angle. In this case, the rotation direction and the rotation angle of the air guide 120 may be limited to the range of the air outlet port 112.

In an example, FIG. 7A illustrates a state in which the air guide 120 is rotated in a downwardly inclined manner, and FIG. 7I illustrates a state in which the air guide 120 is rotated in an inclined direction to the right. As illustrated in FIG. 7A, when the air guide 120 is rotated in the downwardly inclined manner, air discharged through the air outlet port 112 may be discharged downwardly, and as illustrated in FIG. 7B, when the air guide 120 is rotated in a rightward inclined direction, the air discharged through the air outlet port 112 may be discharged to the right.

On the other hand, FIG. 11 illustrates a method of adjusting an air stream direction of the air purifier 100 according to an embodiment of the present disclosure.

As illustrated in FIG. 11, a user pushes the air guide 120 backward to release the rim portion 124 from being pressed onto the annular frame 171, and then rotates the air guide 120 at a desired angle with the desired direction.

Then, when the force of pushing the air guide 120 is released, the air guide 120 moves forward due to the elastic restoring force of the elastic member 184, the rim portion 124 is pressed against the annular frame 171, and the rotation of the air guide 120 may be restrained.

Second Embodiment

Hereinafter, a second embodiment of the present disclosure will be described with reference to FIGS. 12 to 19.

As described above, although the reference numerals in the second embodiment illustrated in FIGS. 12 to 19 are the same reference numerals as those denoted in the first embodiment illustrated in FIGS. 1 to 11, the reference numerals are reference numerals indicating other embodiments.

FIG. 12 illustrates an air purifier capable of adjusting wind directions according to an embodiment of the present disclosure.

A housing 110 of the air purifier capable of adjusting wind directions according to an embodiment of the present disclosure includes a first outflow port 111 in the front thereof to discharge purified air externally, and an upper outflow port 113 in an upper surface thereof to facilitate discharge of purified air upwardly.

In addition, as illustrated in FIG. 13, an air inlet port 115 is provided in the back of the housing 110 such that external air may be drawn into the housing. In this case, the air inlet port 115 is not necessarily provided in the back of the housing 110, but may be provided in a suitable position such as a side, a front surface, a bottom surface or the like.

Further, the housing 110 may have a rear hole 114 penetrating from one surface to the other surface thereof through an air guiding unit to be described later. An air guide member 161 of the air guiding unit to be described later may be connected to the rear hole. In this case, if necessary, the rear hole 114 of the air guide member 161 may be closed by closing a rear surface of the air guide member 161, which may be appropriately modified by those skilled in the art, in consideration of an air stream, circulation and the like.

On the other hand, in a case in which the rear hole 114 is configured to be opened, an aesthetically pleasing effect may be provided to a user, and as the rear hole 114 and the air guide member 161 are connected to each other, external air may be further introduced through the rear hole 114 by a pressure difference generated when the air is discharged externally through the air guide member 161.

On the other hand, describing an air stream according to an embodiment of the present disclosure with reference to FIGS. 14 and 15 in more detail, the housing 110 may include a front cover 116 covering a front surface of the housing 110, and may include an outflow unit 120, an air flow switching unit 130, a support unit 140, an air processing unit 150, an air guiding unit 160, and a direction switching unit 170 therein.

In detail, a pollution degree sensor (not illustrated) for measuring the degree of pollution of indoor air may be further provided on one side of the housing 110, which is not necessarily limited in the present disclosure and may be appropriately selectively applied by those skilled in the art.

First, the outflow unit 120 may include an air intake/outflow fan 121, a blowing motor 122, a first outflow port 123, and a second outflow port 124.

The air intake/outflow fan 121 is provided inside the housing 110. When the air intake/outflow fan 121 is operated, external air is drawn through the air inlet port, purified after passing through the air processing unit, moved to an upper portion of the housing through the first outflow port 123, and may be discharged externally.

In detail, the air intake/outflow fan 121 may be provided as a centrifugal fan capable of exhibiting high suction static pressure and air stream performance. Further, the intake/outflow fan may also be provided as the air intake/outflow fan 121 of a double suction type, capable of bidirectional air drawing. According to the air intake/outflow fan 121 as described above, an air cleaning efficiency is improved, and an air cleaning speed and a discharging speed are improved.

On the other hand, the support unit is configured to include a support frame 141, a through opening 142, and an enclosure 143.

The support frame 141 is provided inside the housing 110 in the form of a partition wall to guide the air discharged from the air intake/outflow fan 121 upwardly such that the air may be smoothly discharged to the outside of the housing 110.

Further, the support frame 141 may be provided with a blowing motor 122 for rotating the air intake/outflow fan 121, and a rotary shaft of the blowing motor 122 may be connected to the air intake/outflow fan 121 by a speed reducer. In addition, the support frame 141 may be provided with the through opening 142, through which the air guide member 161 to be described later passes, and may be provided with the enclosure 143 formed around the through opening 142.

As illustrated in FIG. 15, the enclosure 143 forms a discharge passage F, and is configured to enclose the remaining area except for the second outflow port 124, which is a movement passage of the air moving upward by the air intake/outflow fan 121. In this case, a region corresponding to the second outflow port 124 in the enclosure 143 may be an upper discharge passage 163, and the air having passed through this region is supplied to the inside of the direction switching member 171, to be discharged externally through the second outflow port 112.

On the other hand, the air processing unit is provided inside the housing 110 and may have at least one function among air purification, dehumidification, and humidification.

For example, the air processing unit may include an air purification filter having various functions such as dust collection, deodorization, virus removal and the like in the case of having an air purification function, may include a dehumidifying filter or a heat exchanger in the case of having a dehumidifying function, and may include a humidifying filter, an ultrasonic humidifying unit or a heating humidifying unit in the case of having a humidifying function.

In addition, the air processing unit may together include an air purifying filter and a humidifying filter, or an air purifying filter and a heat exchanger, to have a plurality of functions of air purifying function, dehumidifying function and humidifying function.

On the other hand, the flow path switching unit is provided inside the housing 110, and may guide the air discharged by the air intake/outflow fan 121 upwardly. The flow path switching unit switches a flow path of the air inside the housing 110, such that air may be smoothly discharged to the outside of the housing 110.

The flow path switching unit includes an opening and closing member 131 and an opening and closing motor 132. The rotating shaft of the opening and closing motor 132 may be connected to the opening and closing member 131 by a speed reducer.

The opening and closing member 131 is rotatably provided inside the housing 110 and may open or close a flow path to the second outflow port 124 or the upper outflow port 113. Therefore, a discharge direction of the air may be selected depending on the operation of the opening and closing member 131.

In detail, the opening and closing member 131 may be provided in the form of a curved plate provided at a bifurcation of the flow path of the second outflow port 124 and the upper outflow port 113 side. Further, a rotation angle may be adjusted by rotation of the opening and closing motor 132.

The housing 110 may be provided with the first outflow port 111, the second outflow port 112 and the upper outflow port 113. In this case, when the opening and closing member 131 opens the second outflow port 124 and closes a flow path of the upper outflow port 113 side, the air from the air intake/outflow fan 121 may be introduced into the second outflow port 124 and may be discharged externally through the first outflow port 111 and the second outflow port 112.

As illustrated in FIG. 15, the second outflow port 112 is formed by an outer surface of the air guide member 161 and an inner surface of the direction switching member 171, and may be a space formed between the outer surface of the air guide member 161 and the inner surface of the direction switching member 171.

In this case, as illustrated in FIGS. 16 and 17, the housing 110 having the first outflow port 111 is provided with an air guiding unit connected to the first outflow port 111 to discharge purified air externally, and the direction switching unit provided inside the housing 110 to face the first outflow port 111 to switch a direction of the air discharged to the outside of the housing 110.

The air guiding unit includes an air guide member 161 connected to the first outflow port 111 to extend to the inside of the housing 110 and having an outer surface facing the inner surface of the direction switching member 171, and a guide grille member 162 provided in the first outflow port 111 and connected to the air guide member 161 inside the housing 110.

The air guide member 161 is provided with a hollow to have an inner diameter thereof that is change. The inner diameter gradually increases toward the first outflow port 111. Thus, the air flow around the second outflow port 112 formed by the outer surface of the air guide member 161 and the inner surface of the direction switching member 171 to be described later is generated, and as a result, the air stream amount is increased. In this case, the first outflow port 111 may be a region in which the hollow of the air guide member 161 and the second outflow port 112 are combined.

On the other hand, as illustrated in FIGS. 15 to 18, the direction switching unit may change the degree of inclination or tilting of the housing 110 with respect to the first outflow port 111, to change a direction of the air discharged to the first outflow port 111.

In detail, the direction switching unit is configured to include a direction switching member 171 having an inner surface spaced apart from the outer surface of the air guiding unit by a predetermined distance to form the second outflow port 112, and a switching driver 172 connected to the direction switching member 171 to move the direction switching member 171 with respect to the air outflow port.

The switching driver 172 includes a switching lever 173 connected to the direction switching member 171 to be exposed externally of the first outflow port 111, and a connection link 174 connected to the guide grille member 162 and the direction switching member 171 to be rotatably moved. The user may move the direction switching member 171 through the switching lever 173.

In another aspect, as illustrated in FIG. 19, an actuator 175 is provided on an outer surface of the air guide member 161, and in this case, a body 175b thereof is fixed to the outer surface of the air guide member 161, and a rotary shaft 175a thereof is connected to the inner surface of the direction switching member 171 via a speed reducer (not illustrated).

In detail, in the case in which the actuator 175 is provided as a step motor, as the step motor rotates, the direction switching member 171 rotates by a predetermined angle and rotatably moves with respect to the first outflow port 111.

The tilting direction, tilting degree, tilting angle, and the like of the direction switching member 171 with respect to the first outflow port 11ii are changed, and thus, the direction of the air discharged through the first outflow port 111 externally may be switched.

In detail, the direction switching member 171 may be formed to have an annular shape, and an inner diameter thereof gradually increases toward the first outflow port 111, so that a quick and smooth air flow may be induced.

In this case, the actuator 175 may be electrically connected to a control unit (not illustrated), and a user may control the control unit to control the movement of the direction switching member 171.

In detail, the step motor is electrically connected to a control unit (not illustrated), and the step motor is rotated through a PLC control logic or the like at a predetermined angle for a predetermined time, such that the direction switching member 171 may change an air stream direction by a predetermined angle for a predetermined period of time.

On the other hand, a user may also manually control the movement of the direction switching member 171, which may be implemented through the switching lever 173 exposed externally of the first outflow port 111. As illustrated in FIGS. 16 to 18, when the switching lever 173 is pushed or pulled, the connection link 174 is operated, and thus, the direction switching member 171 may send the air upwardly or downwardly.

In this case, the connection link 174 may include a first connection link 174a connected to the guide grille member 162 and a second connection link 174a respectively hinged (H) to the direction switching member 171 and the first connection link 174a, but the configuration is not necessarily limited in the present disclosure, and may be replaced appropriately by those skilled in the art.

While embodiments have been illustrated and described above, it will be apparent to those skilled in the art that modifications and variations could be made without departing from the scope of the present disclosure as defined by the appended claims.

The invention claimed is:

1. An air purifier capable of adjusting wind directions, comprising:
a housing having an air outlet port in one surface thereof;
an air guide having a front end disposed in a center of the air outlet port and a rear end extending toward the other surface of the housing, in such a manner that the air outlet port has an annular shape, the air guide being coupled to an inside of the housing to be rotatable in a direction inclined with respect to an air discharge direction of the air outlet port; and
a rotation-restraining portion for restraining rotation of the air guide by elastically supporting the air guide on the housing, the rotation-restraining portion comprising:

a pressing frame coupled to an outer circumferential surface of the air guide to be movable in a length direction of the air guide, and having a rear end in contact with a partition wall provided inside the housing; and an elastic member provided between the pressing frame and the air guide to apply elastic restoring force to the air guide in a direction toward the air outlet port.

2. The air purifier capable of adjusting wind directions of claim 1, wherein the air guide has a hollow penetrating from one surface of the housing to the other surface of the housing.

3. The air purifier capable of adjusting wind directions of claim 2, wherein the air outlet port is formed in the front of the housing, and the housing is provided with an air hole communicating with the hollow of the air guide and extending to the back of the housing.

4. The air purifier capable of adjusting wind directions of claim 1, wherein the pressing frame is configured to have a cylindrical shape surrounding the outer circumferential surface of the air guide.

5. The air purifier capable of adjusting wind directions of claim 1, wherein a front end of the air guide is provided with a rim portion having a shape corresponding to a shape of the air outlet port and disposed on the air outlet port, and a plurality of guide blades connected between the rim portion and the air guide along a perimeter of the air guide.

6. The air purifier capable of adjusting wind directions of claim 5, further comprising a rotation guide rotatably supporting the air guide inside the housing.

7. The air purifier capable of adjusting wind directions of claim 6, wherein the rotation guide comprises:

an annular frame surrounding an outer circumferential surface of the rim portion, fixed to an outer periphery of the air outlet port, and supporting a front end of the rim portion against elastic restoring force of the elastic member;

a support frame fixed to the partition wall and supporting the pressing frame against the elastic restoring force of the elastic member; and a connection frame configured to connect the annular frame and the support frame to each other to resist the elastic restoring force of the elastic member.

8. The air purifier capable of adjusting wind directions of claim 7, wherein the outer circumferential surface of the rim portion is configured to have a curved surface convex in a rotational direction of the air guide, and an inner diameter of the annular frame is configured to conform to a maximum outer diameter of the rim portion, in such a manner that the outer circumferential surface of the rim portion and an inner surface of the annular frame come into close contact with each other when the air guide rotates.

9. The air purifier capable of adjusting wind directions of claim 7, wherein the air guide has a hollow penetrating from one surface of the housing to the other surface of the housing, the air outlet port is disposed in the front of the housing,
the housing is provided with an air hole communicating with the hollow of the air guide and extending to the back of the housing, and the support frame is provided with a through hole through which the hollow and the air hole communicate with each other.

10. The air purifier capable of adjusting wind directions of claim 3, wherein the air guide is rotated within a range in which the hollow communicates with the air hole.

11. An air purifier capable of adjusting wind directions, comprising:

a housing having a first outflow port;

an air guiding unit provided in the housing and connected to the first outflow port to discharge purified air externally; and a direction switching unit provided in the housing and moved by a switching lever exposed externally of the housing to switch a direction of air externally discharged through the first outflow port, the direction switching unit comprising:

a direction switching member configured to have an inner surface spaced apart from an outer surface of the air guiding unit by a predetermined distance to form a second outflow port; and a switching driver connected to the direction switching member to move the direction switching member.

12. The air purifier capable of adjusting wind directions of claim 11, wherein the air guiding unit comprises:

an air guide member connected to the first outflow port to extend to the inside of the housing, and having an outer surface facing the inner surface of the direction switching member; and a guide grille member provided in the first outflow port and connected to the air guide member inside the housing.

13. The air purifier capable of adjusting wind directions of claim 12, wherein the switching driver comprises:

a switching lever connected to the direction switching member to be exposed externally of the first outflow port; and a connection link connected to the guide grille member and the direction switching member to rotatably move.

14. The air purifier capable of adjusting wind directions of claim 12, wherein the air guide member is provided with a hollow and is configured to be changed in an inner diameter.

15. The air purifier capable of adjusting wind directions of claim 14, wherein the air guide member has an inner diameter gradually increased toward the first outflow port.

16. The air purifier capable of adjusting wind directions of claim 13, wherein the switching driver further comprises:

at least one actuator provided on an outer surface of the air guide member and having a rotation axis connected to an inner surface of the direction switching member to rotate the direction switching member.

17. The air purifier capable of adjusting wind directions of claim 16, wherein the at least one actuator is a step motor.

18. The air purifier capable of adjusting wind directions of claim 13, wherein the connection link comprises:

a first connection link connected to the guide grille member; and a second connection link rotatably connected to the direction switching member, wherein the first connection link and the second connection link are hingedly connected to each other.

* * * * *